(12) United States Patent
Kingston et al.

(10) Patent No.: US 9,047,640 B2
(45) Date of Patent: Jun. 2, 2015

(54) EXCEEDED ACCOUNT THRESHOLD SERVICE INVOLVING EXCEEDED ACCOUNT THRESHOLD MAGNETIC STRIPE

(71) Applicant: BANK OF AMERICA CORPORATION, Charlotte, NC (US)

(72) Inventors: Tamara S. Kingston, Peoria, AZ (US); Willard Andrew Barr, Charlotte, NC (US); Doris Maria Garrett, Walnut Creek, CA (US); Mark Allan Nelson, Waxhaw, NC (US); Jonathan H. Tucker, Charlotte, NC (US); John Franklin Tuders, Harrisburg, NC (US); Elbert Lee Whitler, Webster Groves, MO (US); Paul Ronald DeKoster, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 285 days.

(21) Appl. No.: 13/840,631

(22) Filed: Mar. 15, 2013

(65) Prior Publication Data

US 2013/0214042 A1  Aug. 22, 2013

Related U.S. Application Data

(63) Continuation-in-part of application No. 13/094,564, filed on Apr. 26, 2011, now abandoned, and a continuation-in-part of application No. 12/879,866, filed on Sep. 10, 2010.

(60) Provisional application No. 61/416,652, filed on Nov. 23, 2010.

(51) Int. Cl.
*G06Q 20/00* (2012.01)
*G06Q 40/02* (2012.01)
(Continued)

(52) U.S. Cl.
CPC ............... *G06Q 40/02* (2013.01); *G06Q 20/20* (2013.01); *G06Q 20/40* (2013.01); *G06Q 20/4012* (2013.01); *G06Q 20/023* (2013.01); *G06Q 20/3278* (2013.01); *G06Q 30/06* (2013.01)

(58) Field of Classification Search
CPC ....................................................... G06Q 22/20
USPC .......................................................... 705/16
See application file for complete search history.

(56) References Cited

U.S. PATENT DOCUMENTS 6,021,400 A   2/2000   Gallacher et al.
6,081,792 A   6/2000   Cucinotta et al.
(Continued)

OTHER PUBLICATIONS

Utility U.S. Appl. No. 12/879,866, filed Sep. 10, 2010, Quintiliani et al.
(Continued)

*Primary Examiner* — Hunter Wilder
(74) *Attorney, Agent, or Firm* — Michael A. Springs; Moore & Van Allen PLLC; Nicholas C. Russell

(57) ABSTRACT

In general terms, embodiments of the present invention relate to methods and apparatuses for providing an account exceeding available funds or credit service involving an account exceeding available funds or credit magnetic stripe. For example, in some embodiments, a method is provided that includes: (a) receiving transaction information associated with a transaction, where the transaction involves a transaction machine and an account, and where the account is associated with a credit/debit card; (b) determining, based at least partially on the transaction information, that the account will incur an account exceeding available funds or credit as a result of the transaction; (c) receiving account exceeding available funds or credit swipe information indicating that an account exceeding available funds or credit magnetic stripe of the credit/debit card was swiped at the transaction machine; and (d) authorizing the transaction based at least partially on receiving the account exceeding available funds or credit swipe information.

34 Claims, 6 Drawing Sheets

(51) Int. Cl.
*G06Q 20/20* (2012.01)
*G06Q 20/40* (2012.01)
*G06Q 20/02* (2012.01)
*G06Q 20/32* (2012.01)
*G06Q 30/06* (2012.01)

(56) References Cited

U.S. PATENT DOCUMENTS

| | | |
|---|---|---|
| 6,457,640 B2 | 10/2002 | Ramachandran et al. |
| 7,216,083 B2 | 5/2007 | Parmelee et al. |
| 7,370,004 B1 | 5/2008 | Patel et al. |
| 7,428,495 B2 | 9/2008 | Dhar et al. |
| 2002/0040339 A1 | 4/2002 | Dhar et al. |
| 2002/0055904 A1 | 5/2002 | Mon |
| 2003/0009418 A1 | 1/2003 | Green et al. |
| 2003/0033251 A1* | 2/2003 | Sherlock .................. 705/43 |
| 2004/0215566 A1 | 10/2004 | Meurer |
| 2006/0027647 A1* | 2/2006 | Deane et al. ................. 705/14 |
| 2006/0059085 A1 | 3/2006 | Tucker |
| 2006/0129478 A1 | 6/2006 | Rees |
| 2006/0249568 A1 | 11/2006 | Scanlon |
| 2007/0080207 A1 | 4/2007 | Williams |
| 2007/0106558 A1 | 5/2007 | Mitchell et al. |
| 2007/0118470 A1 | 5/2007 | Warren et al. |
| 2007/0262137 A1 | 11/2007 | Brown |
| 2008/0103970 A1 | 5/2008 | Books et al. |
| 2008/0210754 A1 | 9/2008 | Lovett |
| 2009/0055313 A1 | 2/2009 | Elterich |
| 2009/0081990 A1 | 3/2009 | Granucci et al. |
| 2009/0089205 A1 | 4/2009 | Bayne |
| 2009/0094125 A1 | 4/2009 | Killian et al. |
| 2009/0171837 A1 | 7/2009 | Moreno |
| 2009/0261161 A1 | 10/2009 | Blossom |
| 2009/0281904 A1 | 11/2009 | Pharris |
| 2010/0065628 A1 | 3/2010 | Carmichael et al. |
| 2011/0125643 A1 | 5/2011 | Cameo et al. |
| 2011/0320292 A1* | 12/2011 | Perdue .................. 705/16 |
| 2012/0066077 A1 | 3/2012 | Kingston et al. |
| 2012/0066127 A1 | 3/2012 | Kingston et al. |

OTHER PUBLICATIONS

A-9 Model Consent Form for Overdraft Services, 1 page total; http://www.federalreserve.gov/DCAA/RegulationE/20081218/A-9.pdf, Dec. 18, 2008.

"5 Ideas to Fix the Ugly in Overdraft Fees", Sep. 23, 2009 (8 pages total); downloaded Sep. 22, 2010; http://thefinancialbrand.com/7795/fixing-overdraft-ugliness/.

\* cited by examiner

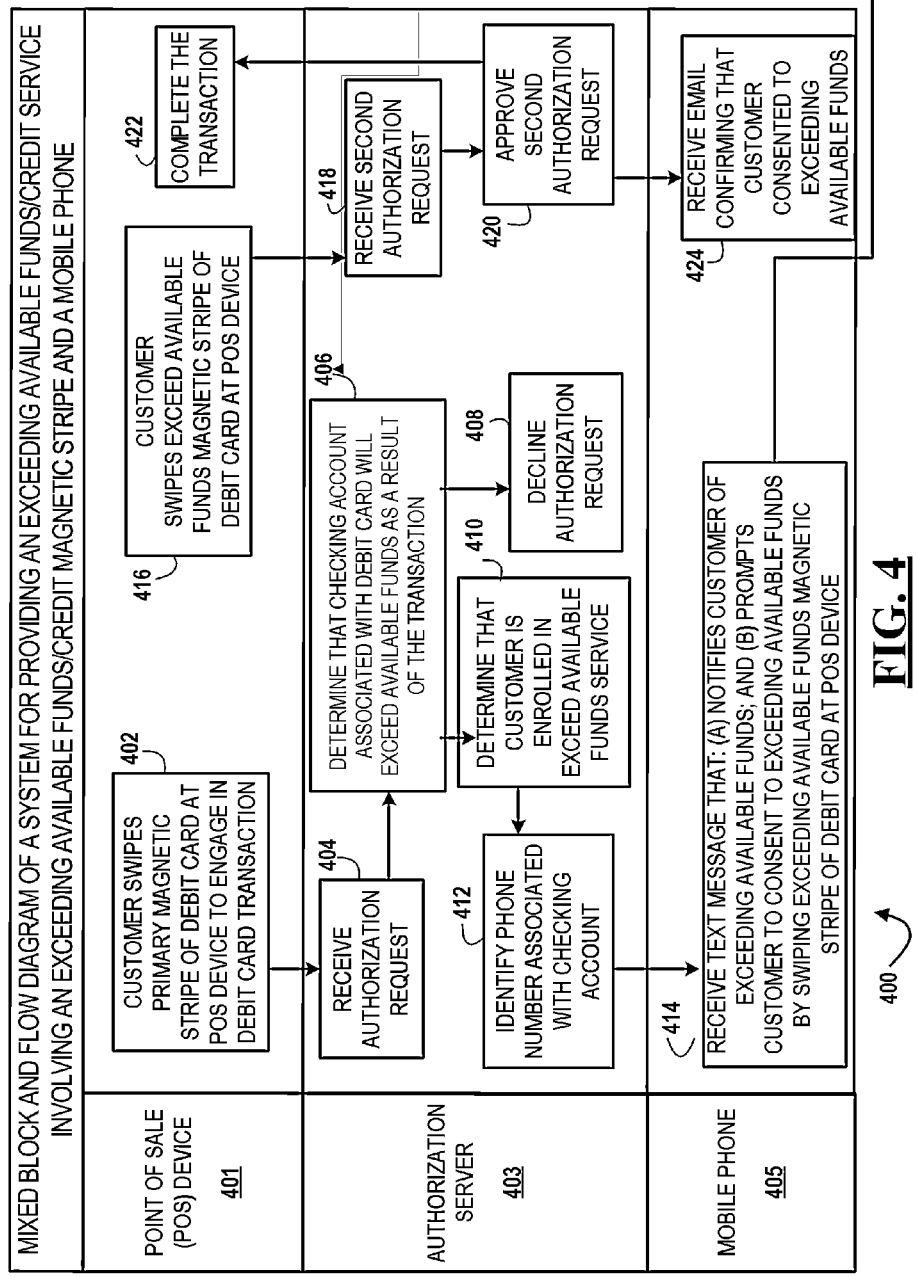

ND THRESHOLD
EXCEEDED ACCOUNT THRESHOLD SERVICE INVOLVING EXCEEDED ACCOUNT THRESHOLD MAGNETIC STRIPE

CROSS-REFERENCE TO RELATED APPLICATIONS

The present application is a continuation-in-part application of, and claims priority to, U.S. patent application Ser. No. 13/101,635, which was filed on May 5, 2011, and is entitled "Exceeding available funds or credit threshold Service Involving Magnetic Stripe", and which incorporated by reference herein in its entirety. The present application also claims priority to U.S. patent application Ser. No. 12/879,866, which was filed on Sep. 10, 2010, and is entitled "Service Participation Acknowledgment System," and which is incorporated by reference herein in its entirety. The present application also claims priority to U.S. Provisional Patent Application No. 61/416,652, which was filed on Nov. 23, 2010, and is entitled "Exceeding available funds or credit threshold Communication Systems," and which is incorporated by reference herein in its entirety. The present application further claims priority to U.S. Provisional Patent Application No. 61/436,196, which was filed on Jan. 26, 2011, and is entitled "Exceeding available funds or credit threshold Communication Systems," and which is incorporated by reference herein in its entirety.

BACKGROUND

Financial institution customers are constantly looking for new and useful ways to better manage their finances. This is particularly so given that most of today's customers have multiple financial accounts and the effects associated with mismanaging or forgetting about any one of them can lead to unexpected and/or unwanted outcomes. For example, a customer may cause a debit account to exceed the available funds of his checking account and incur a related debit account exceeding available funds payment by engaging in a transaction that he mistakenly believes his account can cover. Accordingly, there is a need to provide methods and apparatuses that help financial institution customers manage their finances in ways that avoid or reduce unexpected or unwanted outcomes.

SUMMARY OF SELECTED EMBODIMENTS OF THE PRESENT INVENTION

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In general terms, embodiments of the present invention relate to methods and apparatuses for providing an account exceeding available funds or credit service involving an account exceeding available funds or credit magnetic stripe. In some embodiments, the account exceeding available funds or credit magnetic stripe is embodied as a physical stripe that is disposed on a physical credit/debit card, where the credit/debit card is associated with an account. In other embodiments, the account exceeding available funds or credit magnetic stripe is embodied as a virtual stripe that is associated with a virtual credit/debit card and stored on a mobile device, where the mobile device is configured to operate as a mobile wallet. Further, in some embodiments, the credit/debit card includes a primary magnetic stripe, which may be a physical stripe disposed on the credit/debit card or a virtual stripe associated with the credit/debit card. In such embodiments, the credit/debit card is sometimes referred to as a card having a "dual magstripe." In some embodiments, the primary magnetic stripe and the account exceeding available funds or credit magnetic stripe each stores information therein, including, for example, an account number, credit/debit card number, name of the account holder, passcode (e.g., personal identification number (PIN)) associated with the account/card/holder, card verification value (CVV) associated with the credit/debit card, and/or the like. It will be understood that at least some of the information stored in the primary magnetic stripe may be different than at least some of the information stored in the account exceeding available funds or credit magnetic stripe (e.g., a first PIN "xxxx" is stored in the primary magnetic stripe, whereas a second PIN "XXXX" is stored in the account exceeding available funds or credit magnetic stripe).

In addition, it will be understood that, in some embodiments, the primary magnetic stripe is used to engage in one or more regular, day-to-day transactions, which may or may not result in the account incurring an account exceeding available funds or credit. However, in some of these embodiments, if the primary magnetic stripe is used to engage in a transaction that will result in the account incurring an account exceeding available funds or credit, the transaction may be declined. In contrast, the account exceeding available funds or credit magnetic stripe can be used to engage in any kind of transaction, including those that will result in the account incurring an account exceeding available funds or credit. Additionally or alternatively, the account exceeding available funds or credit magnetic stripe can be used by the account holder to indicate that he agrees and/or otherwise consents to incurring an account exceeding available funds or credit, using an account exceeding available funds or credit service, completing an account exceeding available funds or credit transaction, incurring an account exceeding available funds or credit payment, and/or the like.

As a specific example of an embodiment of the present invention, (a) a bank customer swipes the primary magnetic stripe of a dual magstripe debit card at a POS device to engage in a transaction, where the debit card is associated with a checking account involved in the transaction; (b) an apparatus maintained by the bank determines that the checking account will incur an debit account exceeding available funds or credit as a result of the transaction (i.e., makes an debit account exceeding available funds or credit determination); (c) the apparatus declines the debit account exceeding available funds or credit transaction as a result of making the debit account exceeding available funds or credit determination; (d) after perceiving that the transaction was declined, the customer swipes the debit account exceeding available funds or credit magnetic stripe of the dual magstripe debit card at the POS device to indicate that the customer agrees to debit account exceeding available funds or credit the checking account, to complete the transaction, to incur an debit account exceeding available funds or credit payment, and/or the like; and (e) the apparatus authorizes and/or completes the transaction based at least partially on the apparatus receiving information indicating that the debit account exceeding available funds or credit magnetic stripe was swiped at the POS device. In some embodiments, the apparatus is configured to determine that the customer has consented to the debit account exceeding available funds or credit if the customer's debit account exceeding available funds or credit magnetic stripe is swiped at the POS device.

In the above example, because the customer has the dual magstripe debit card, the customer can decide whether to swipe the debit account exceeding available funds or credit magnetic stripe at the POS device in order to debit account exceeding available funds or credit the checking account and complete the debit account exceeding available funds or credit transaction. By empowering the customer with this decision, embodiments of the present invention may reduce or eliminate the possibility that the customer will unknowingly or unexpectedly engage in a debit account exceeding available funds or credit transaction (and/or unknowingly or unexpectedly incur a debit account exceeding available funds or credit payment). In addition, because the customer swipes the debit account exceeding available funds or credit magnetic stripe at the POS device during the transaction (e.g., after the transaction is initiated but before the transaction is authorized and/or completed), the customer is able to make this decision in real-time, on a per-transaction basis, and/or while the customer is still at the POS device. Further, in some embodiments, the debit card and/or POS device may be configured so that the customer can swipe the debit account exceeding available funds or credit magnetic stripe discreetly, thereby avoiding any potential embarrassment associated with incurring the debit account exceeding available funds or credit and/or using the debit account exceeding available funds or credit service.

In more general terms, some embodiments of the present invention provide a method that includes: (a) receiving transaction information associated with a transaction, where the transaction involves a transaction machine and an account, and where the account is associated with a credit/debit card; (b) determining, based at least partially on the transaction information, that the account will incur an account exceeding available funds or credit as a result of the transaction; (c) receiving account exceeding available funds or credit swipe information indicating that an account exceeding available funds or credit magnetic stripe of the credit/debit card was swiped at the transaction machine; and (d) authorizing the transaction based at least partially on the receiving the account exceeding available funds or credit swipe information.

As another example, some embodiments of the present invention provide an apparatus that includes: (a) a communication interface configured to: (i) receive, via a payment network, transaction information associated with a transaction, where the transaction involves a transaction machine and an account, and where the account is associated with a credit/debit card; and (ii) receive account exceeding available funds or credit swipe information indicating that an account exceeding available funds or credit magnetic stripe of the credit/debit card was swiped at the transaction machine; and (b) a processor operatively connected to the communication interface and configured to: (i) determine, based at least partially on the transaction information, that the account will incur an account exceeding available funds or credit as a result of the transaction; and (ii) authorize the transaction based at least partially on the communication interface receiving the account exceeding available funds or credit swipe information.

As still another example, some embodiments of the present invention provide a computer program having a non-transitory computer-readable medium, where the non-transitory computer-readable medium includes one or more computer-executable program code portions that, when executed by a computer, cause the computer to: (a) receive transaction information associated with a transaction, where the transaction involves a transaction machine and an account, where the account is associated with a credit/debit card, and where the credit/debit card includes a primary magnetic stripe and an account exceeding available funds or credit magnetic stripe; (b) determine that the account will incur an account exceeding available funds or credit as a result of the transaction; (c) receive account exceeding available funds or credit swipe information indicating that the account exceeding available funds or credit magnetic stripe was swiped at the transaction machine, where the computer receives the account exceeding available funds or credit swipe information after the computer determines that the account will incur the account exceeding available funds or credit; and (d) authorize the transaction based at least partially on the computer receiving the account exceeding available funds or credit swipe information.

As yet another example, some embodiments of the present invention provide another method that includes: (a) receiving an authorization request associated with a transaction, where the transaction involves a transaction machine and an account, where the account is associated with a credit/debit card, and where the credit/debit card has a primary magnetic stripe and an account exceeding available funds or credit magnetic stripe; (b) determining that the account balance exceeds the available funds or the credit maximum; (c) determining that the authorization request includes information from the primary magnetic stripe; (d) declining the authorization request based at least partially on the determining that the authorization request includes information from the primary magnetic stripe and the determining that the account balance exceeds the available funds or the credit maximum; (e) receiving a second authorization request associated with a second transaction, where the second transaction involves the transaction machine and the account; (f) determining that the second authorization request includes information from the account exceeding available funds or credit magnetic stripe; and (g) approving the second authorization request based at least partially on the determining that the second authorization request includes information from the account exceeding available funds or credit magnetic stripe.

As still another example, some embodiments of the present invention provide a method that includes: (a) swiping, by a holder of an account, a primary magnetic stripe of a credit/debit card at a transaction machine to engage in a transaction, where the credit/debit card is associated with the account; (b) receiving, by the holder, a message that prompts the holder to swipe an account exceeding available funds or credit magnetic stripe of the credit/debit card at the transaction machine, where the receiving the message occurs after the swiping the primary magnetic stripe and while the holder is still at the transaction machine; and (c) swiping, by the holder, the account exceeding available funds or credit magnetic stripe of the credit/debit card at the transaction machine, where the swiping the account exceeding available funds or credit magnetic stripe occurs after the receiving the message, and where the transaction is approved after the holder swipes the account exceeding available funds or credit magnetic stripe.

As another example, some embodiments of the present invention provide a system that includes: (a) a credit/debit card having a primary magnetic stripe and an account exceeding available funds or credit magnetic stripe, where the credit/debit card is associated with an account and configured to be swiped at a transaction machine; and/or (b) an authorization apparatus operatively connected to the transaction machine via a payment network, and configured to: (i) decline a first account exceeding available funds or credit transaction involving the account if the primary magnetic stripe of the credit/debit card was swiped at the transaction machine to engage in the first account exceeding available funds or credit transaction; and (ii) approve a second account exceeding available funds or credit transaction involving the account if the account exceeding available funds or credit magnetic stripe of the credit/debit card was swiped at the transaction machine to engage in the second account exceeding available funds or credit transaction.

BRIEF DESCRIPTION OF THE DRAWINGS

Figure 1:
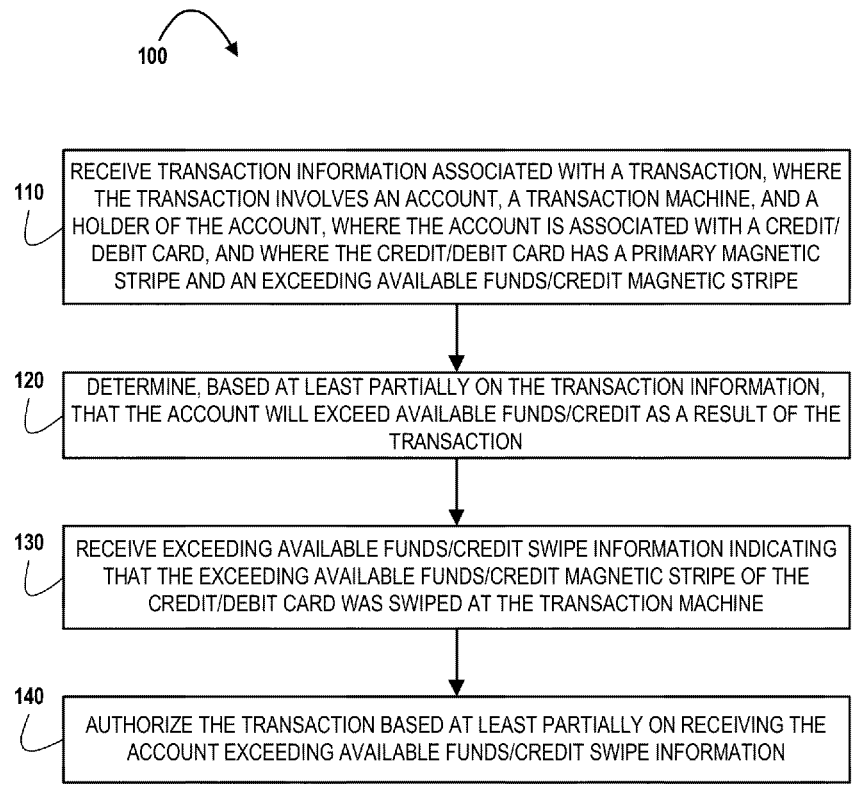
Figure 2:
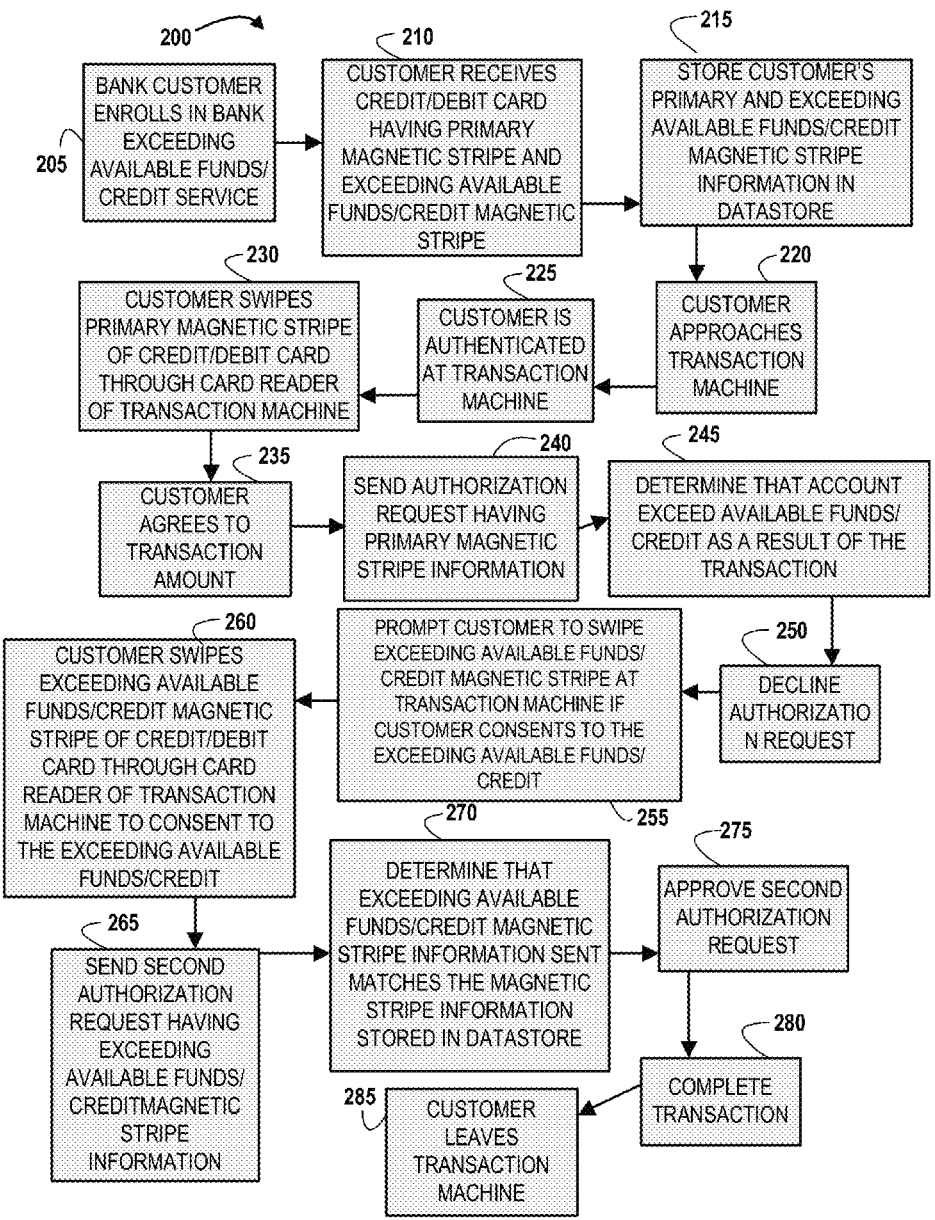
Figure 3:
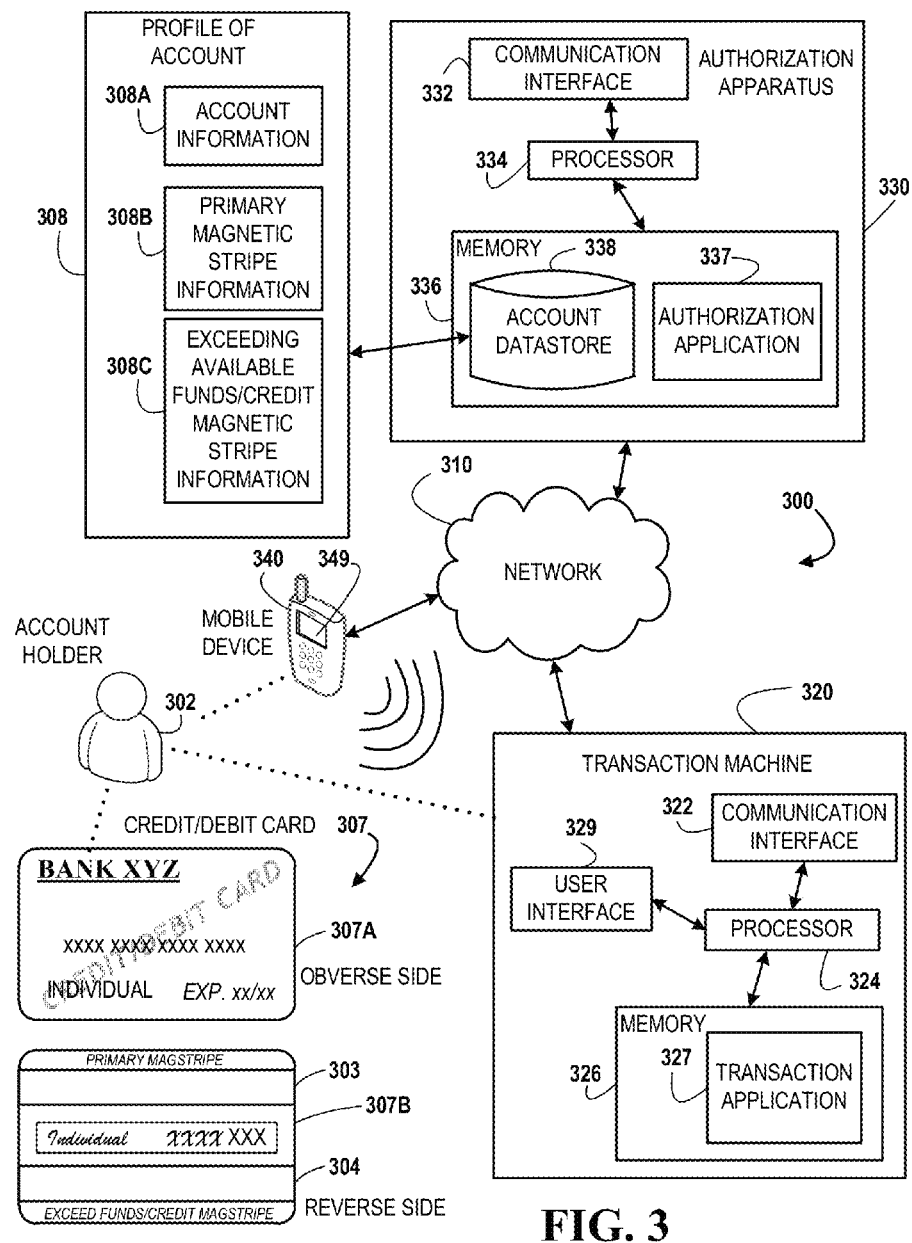
Figure 3A:
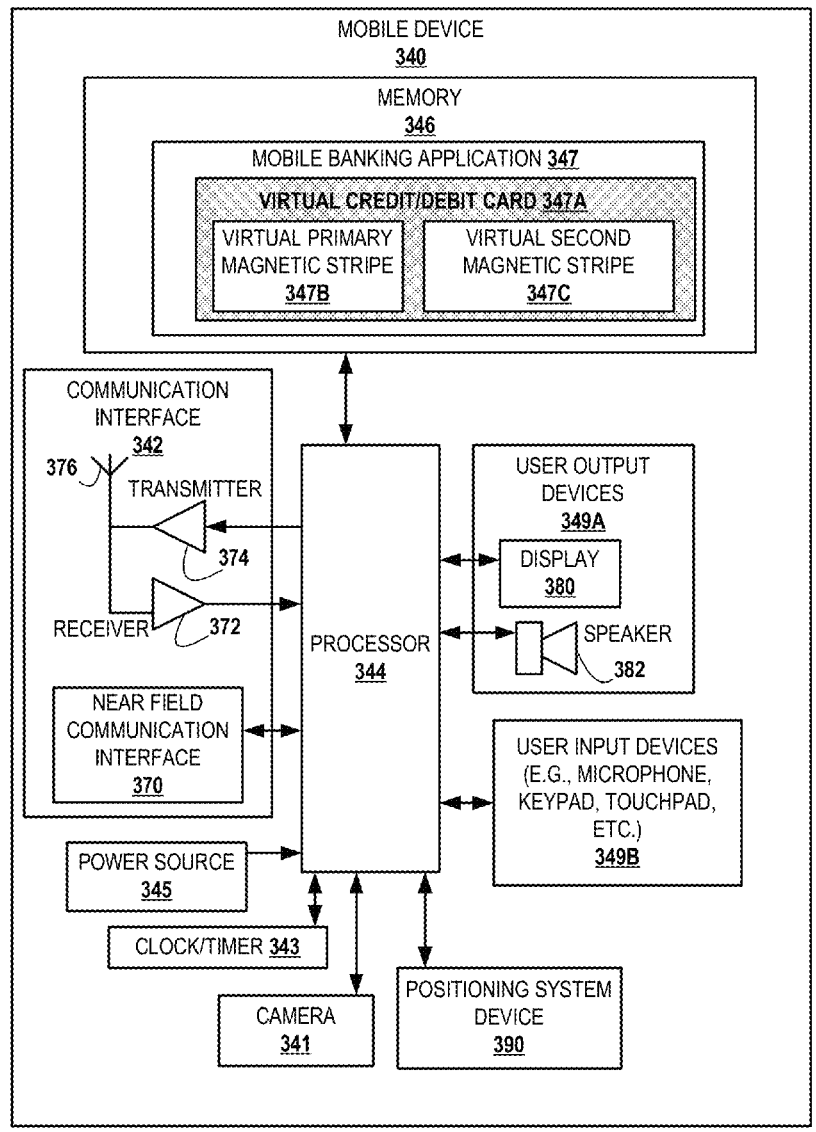
Figure 5:
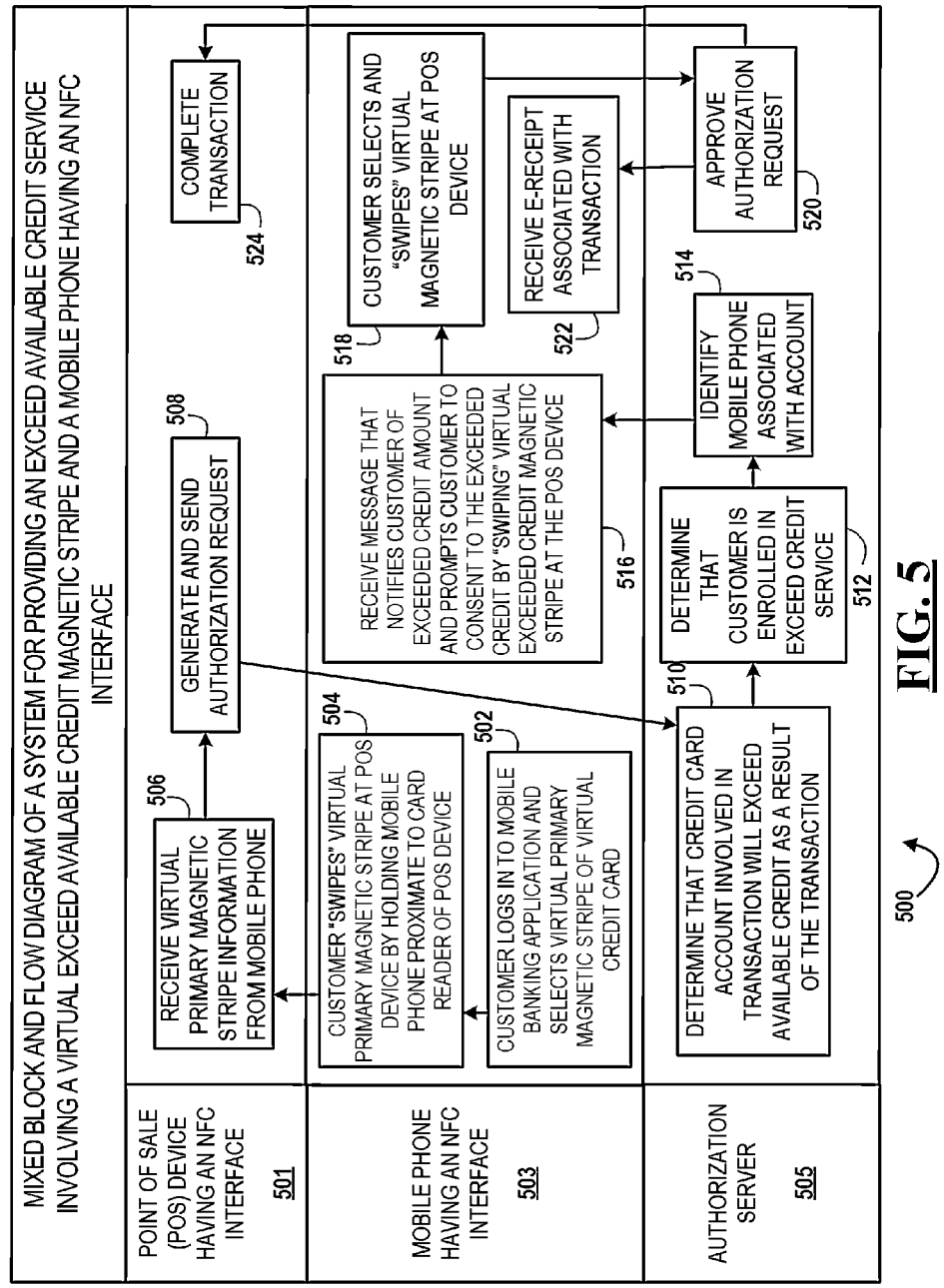

Having thus described some embodiments of the present invention in general terms, reference will now be made to the accompanying drawings, where:

FIG. 1 is a flow diagram illustrating a general process flow for providing an account exceeding available funds or credit service involving an account exceeding available funds or credit magnetic stripe, in accordance with an embodiment of the present invention;

FIG. 2 is a flow diagram illustrating a more-detailed process flow for providing an account exceeding available funds or credit service involving an account exceeding available funds or credit magnetic stripe, in accordance with an embodiment of the present invention;

FIG. 3 is a block diagram illustrating technical components of a system for providing an account exceeding available funds or credit service involving an account exceeding available funds or credit magnetic stripe, in accordance with an embodiment of the present invention;

FIG. 3A is a block diagram illustrating technical components of a mobile device configured to participate in an account exceeding available funds or credit service involving an account exceeding available funds or credit magnetic stripe, in accordance with an embodiment of the present invention;

FIG. 4 is a mixed block and flow diagram of a system for providing an account exceeding available funds or credit service involving an account exceeding available funds or credit magnetic stripe and a mobile phone, in accordance with an embodiment of the present invention; and FIG. 5 is a mixed block and flow diagram of a system for providing an account exceeding available funds or credit service involving a virtual account exceeding available funds or credit magnetic stripe and a mobile phone having a near field communication (NFC) interface, in accordance with an embodiment of the present invention.

DETAILED DESCRIPTION OF EMBODIMENTS OF THE PRESENT INVENTION

Referring now to FIG. 1, a general process flow 100 for providing an account exceeding available funds or credit service involving an account exceeding available funds or credit magnetic stripe is provided, in accordance with an embodiment of the present invention. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive transaction information associated with a transaction, where the transaction involves an account, a transaction machine, and a holder of the account, where the account is associated with a credit/debit card, and where the credit/debit card has a primary magnetic stripe and an account exceeding available funds or credit magnetic stripe. As represented by block 120, the apparatus is also configured to determine, based at least partially on the transaction information, that the account will incur an account exceeding available funds or credit (e.g., incur an account exceeding available funds or credit, go over a maximum credit threshold, and the like) as a result of the transaction. In addition, as represented by block 130, the apparatus is further configured to receive account exceeding available funds or credit swipe information indicating that the account exceeding available funds or credit magnetic stripe of the credit/debit card was swiped at the transaction machine. As represented by block 140, the apparatus is further configured to authorize the transaction based at least partially on the apparatus receiving the account exceeding available funds or credit swipe information.

For simplicity, it will be understood that the portion of the process flow represented by block 120 is sometimes referred to herein as the "account exceeding available funds or credit determination." Also, the phrase "account exceeding available funds or credit transaction" is sometimes used to refer to a transaction that, if completed, would cause the account to incur an account exceeding available funds or credit (e.g., incur a debit account exceeding available funds or credit, go over a maximum credit threshold, and the like). In addition, it will be understood that, in some embodiments, the term "determine" is meant to have one or more of its ordinary meanings (i.e., its ordinary dictionary definition(s)), but that in other embodiments, that term is meant to have one or more ordinary meanings of one or more of the following terms: decide, conclude, verify, ascertain, find, discover, learn, calculate, observe, read, and/or the like. Further, in some embodiments, the phrase "based at least partially on" is meant to have one or more of its ordinary meanings, but that in other embodiments, that phrase is meant to have one or more ordinary meanings of one or more of the following terms and/or phrases: as a result of, because of, after, if, when, in response to, and/or the like. Still further, in some embodiments, the term "via" is meant to have its one or more ordinary meanings, but in other embodiments, that term is meant to have one or more ordinary meanings of one or more of the following terms and/or phrases: from, through, per, with the assistance of, by way of, and/or the like.

It will also be understood that the apparatus having the process flow 100 can include one or more separate and/or different apparatuses. For example, in some embodiments, one apparatus (e.g., the transaction machine 320 described in connection with FIG. 3, and the like) is configured to perform the portion of the process flow 100 represented by block 110, and a second apparatus (e.g., the authorization apparatus 330) is configured to perform the portions represented by blocks 120-140. As still another example, in some embodiments, a single apparatus (e.g., the authorization apparatus 330) is configured to perform each and every portion of the process flow 100. It will also be understood that, in some embodiments, a transaction machine (e.g., the transaction machine 320) is configured to perform one or more (or all) of the portions of the process flow 100, and that in some embodiments, that transaction machine includes, is included in, and/or is embodied as the transaction machine referred to in block 110.

Regarding block 110, the phrase "credit/debit card," as used herein, generally refers to (physical or virtual) credit and/or debit card that is associated with a credit and/or deposit account. In some embodiments, the credit/debit card is embodied as a physical credit/debit card, and the primary and account exceeding available funds or credit magnetic stripes (sometimes referred to herein as "magstripes") are physically disposed on the credit/debit card. In such embodiments, the card may have any amount and/or type of information printed, embossed, and/or otherwise disposed thereon, including, but not limited to, the credit/debit card number, the name of the holder, the expiration date of the credit/debit card and/or account, information that identifies the financial institution that issued the card and maintains the account, a signature line for the holder's written signature, a CVV, the physical primary magnetic stripe, the physical account exceeding available funds or credit magnetic stripe, and/or the like. In some embodiments, the physical credit/debit card is embodied as a small plastic card having a size and shape specified by an international standard. In some embodiments, the card is substantially rectangular in shape, has rounded corners, and is approximately 85.60×53.98 mm (i.e., 3.370×2.125 in.) in size.

The magnetic stripes of the credit/debit card may be embodied as any kind of datastore, whether magnetic or otherwise. In some embodiments, the magnetic stripes are embodied as bands of magnetic material capable of storing information therein. In such embodiments, an apparatus (e.g., the apparatus having the process flow 100, the transaction machine referred to in the process flow 100, a credit/debit card reader) may be configured to read some or all of the information stored in these magnetic stripes based at least partially on the credit/debit card being physically brought into contact with the apparatus.

Additionally, the information stored in the magnetic stripes may be of any amount and/or type. For example, in some embodiments, each of the magnetic stripes stores information associated with the account number, name of the account holder, expiration date of the credit/debit card and/or account, passcode, CVV, identity of the issuing financial institution, identity of the payment network. Further, each magnetic stripe may include one or more tracks (e.g., two or three tracks), which may be lines of information embedded into each magnetic stripe. Each of these tracks may include any of the information described above and may be individually read by a card reader.

In some embodiments, the primary magnetic stripe includes at least some information that is different than at least some of the information stored in the account exceeding available funds or credit magnetic stripe. For example, in some embodiments, the primary magnetic stripe has a first passcode (e.g., PIN, password, string, and the like) stored therein, and the account exceeding available funds or credit magnetic stripe has a second passcode stored therein, where the second passcode is different than the first passcode (e.g., "xxxx" vs. "XXXX"). In such embodiments, the apparatus can be configured to determine which magnetic stripe was swiped at the transaction machine by determining which password is included in the transaction information and/or in the account exceeding available funds or credit swipe information. Of course, instead of the passcodes, the apparatus may detect other types of information that differ between the magnetic stripes, including, for example, account numbers, CVVs, the name of the holder, expiration dates, and/or the like.

In some embodiments, where the credit/debit card is physical card, the primary magnetic stripe is positioned above and/or substantially parallel to the account exceeding available funds or credit magnetic stripe. However, the relative positioning of the magnetic stripes may be different in other embodiments. For example, in some embodiments, the account exceeding available funds or credit magnetic stripe is disposed on the same side of the credit/debit card as the primary magnetic stripe, but the two magnetic stripes are not oriented parallel with one another (e.g., they may be oriented substantially perpendicular to one another). As another example, in some embodiments, the primary magnetic stripe may be disposed on the obverse (front) side of the credit/debit card, whereas the account exceeding available funds or credit magnetic stripe may be disposed on the reverse (back) side of the credit/debit card. Further, in some embodiments, the primary magnetic stripe may have a different physical appearance (e.g., size, shape, color, texture, and the like) than the account exceeding available funds or credit magnetic stripe, which may aid the holder in distinguishing the two stripes and prevent the holder from mistakenly swiping the one magnetic stripe instead of the other. In addition, as shown in FIG. 3, the magnetic stripes may be labeled (e.g., "primary magstripe," "account exceeding available funds or credit magstripe") and/or disposed on different sides of the card to achieve this same purpose.

In some embodiments, instead of being a physical card, the credit/debit card referred to in block 110 is a virtual credit/debit card, and the primary and account exceeding available funds or credit magnetic stripes are virtual magnetic stripes that are associated with the virtual credit/debit card. Specifically, in some embodiments, the virtual credit/debit card and/or the virtual magnetic stripes may be embodied as hardware (e.g., any of the NFC interfaces described herein) and/or software (e.g., applications, tools, private keys, modules, and the like), and may be included in, stored on, downloaded onto, installed on, attached to, and/or executable on a mobile device. In some of these embodiments, the mobile device is accessible to the holder during the transaction. Also, in some embodiments, the mobile device is configured to operate as a mobile wallet, such that the information stored on the virtual credit/debit card and/or the virtual magnetic stripes can be wirelessly and/or contactless transmitted from the mobile device to the transaction machine and/or apparatus having the process flow 100 in order to engage in one or more transactions (e.g., NFC transactions, web-based transactions, and the like).

It will be understood that the primary magnetic stripe is generally used to engage in one or more regular, day-to-day transactions, which may or may not result in the account incurring an account exceeding available funds or credit. However, in some of these embodiments, if the primary magnetic stripe is used to engage in an account exceeding available funds or credit transaction, the transaction may be declined. In contrast, the account exceeding available funds or credit magnetic stripe can be used to engage in any kind of transaction, including account exceeding available funds or credit transactions. Additionally or alternatively, the account exceeding available funds or credit magnetic stripe can be used by the account holder to indicate that the holder "consents to the account exceeding available funds or credit." This phrase is meant to be understood in its broadest sense. For example, in some embodiments, the phrase "consent to the account exceeding available funds or credit" means consent to: (a) incurring the account exceeding available funds or credit (e.g., the account and/or the holder incurring the account exceeding available funds or credit, and the like); (b) incurring an account exceeding available funds or credit payment associated with the account exceeding available funds or credit (e.g., now or at the end of the day in which the transaction occurred if the account settles negative, and the like); (c) one or more terms of an account exceeding available funds or credit service; (d) using the account exceeding available funds or credit service for this transaction (i.e., the transaction referred to in block 110); (e) incurring an account exceeding available funds or credit payment associated with using the account exceeding available funds or credit service;

and/or (f) completing the transaction. Thus, for example, the holder may swipe the account exceeding available funds or credit magnetic stripe at the transaction machine to indicate that the holder consents to: (a) incurring account exceeding available funds or credit; (b) incurring an account exceeding available funds or credit payment associated with the account exceeding available funds or credit; and (c) completing the transaction. Further, as understood herein, the account exceeding available funds or credit magnetic stripe is sometimes referred to as a "credit account exceeding available funds or credit magnetic stripe" when associated with a credit card, and referred to as a "debit account exceeding available funds or credit magnetic stripe" when associated with a debit card.

Also, it will be understood that, in some embodiments, the information stored in one or both magnetic stripes may be secret and/or confidential, such that, for example, the information is known only to the holder and the holder's financial institution. In some embodiments, the information stored in one or both of the magnetic stripes are not known to, readable by, and/or otherwise apparent to the holder, either before, during, and/or after the transaction. For example, in some embodiments, the magnetic stripes are configured to store information therein that is readable by an apparatus but not to by the account holder or any other human (e.g., because the magnetic stripe appears as a solid black band disposed on the card). Also, it will be understood that the financial institution that issues the credit/debit card and/or maintains the account may store, in a datastore, the information that is stored in one or both of the magnetic stripes.

Still regarding block 110, the phrase "transaction machine," as used herein, typically refers to an interactive computer terminal that is configured to initiate, perform, complete, and/or facilitate one or more financial transactions. Examples of transaction machines include, but are not limited to, ATMs, POS devices (e.g., merchant terminals, and the like), self-service machines (e.g., vending machine, self-checkout machine, parking meter, and the like), public and/or business kiosks (e.g., an Internet kiosk, ticketing kiosk, bill pay kiosk, and the like), mobile phones (e.g., feature phone, smart phone and the like), gaming devices, computers (e.g., personal computers, tablet computers, laptop computers, and the like), personal digital assistants (PDAs), and/or the like.

In some embodiments, the transaction machine referred to in block 110 is located in a public place and is available for public use (e.g., on a street corner, on the exterior wall of a banking center, at a public rest stop, and the like). In other embodiments, the transaction machine is additionally or alternatively located in a place of business and available for public and/or business customer use (e.g., in a retail store, post office, banking center, grocery store, and the like). In accordance with some embodiments, the transaction machine is not owned by the user of the transaction machine and/or the holder of the account referred to in block 110. However, in other embodiments, the transaction machine is located in a private place, is available for private use, and/or is owned by the user of the transaction machine and/or the holder referred to in block 110.

Further regarding block 110, the transaction involving the holder and the transaction machine can include any number and/or type of transaction(s) involving a transaction machine. For example, in some embodiments, the transaction includes one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; and the like); sending remittances; transferring balances from one account to another account; loading money onto stored value cards; donating to charities; and/or the like.

Also, the account referred to in the process flow 100 can include any number and/or type of account(s). For example, in some embodiments, the account includes a checking account, savings account, money market account, investment account, brokerage account, certificate of deposit account, and/or any other type of deposit account. In some embodiments, the deposit account is one or more accounts that can incur a debit account exceeding available funds or credit and/or be overdrawn. Of course, it will be understood that embodiments of the present invention may also apply to one or more credit accounts, such as a credit card account, line of credit (LOC) account, store credit account, and/or the like. Additionally or alternatively, in some embodiments, the credit account is one or more accounts that can incur an amount "credit account exceeding available funds or credit."

In some embodiments, the account, the transaction machine, and the apparatus having the process flow 100 are each controlled, serviced, owned, managed, operated, and/or maintained (collectively referred to herein as "maintained" for simplicity) by a single financial institution. For example, in some embodiments, the apparatus is maintained by a bank, the account is maintained by the bank, the transaction machine is owned by the bank, and the holder is a customer of the bank. Of course, it will be understood that, in some embodiments, the apparatus, the transaction machine, and/or the account are not maintained by the same financial institution (or any financial institution).

The transaction information referred to in block 110 can be any information that identifies, defines, describes, and/or is otherwise associated with the transaction. Exemplary transaction information includes, but is not limited to, the party(ies) involved in the transaction, the date and/or time of the transaction, the type and/or identity of the transaction machine (e.g., POS device, ATM), the account(s) involved in the transaction, the information stored in the primary magnetic stripe, the information stored in the account exceeding available funds or credit magnetic stripe, the information associated with/or on the credit/debit card, the transaction amount(s) associated with the transaction, the good(s) and/or service(s) involved in the transaction (e.g., product names, stock keeping unit (SKU) information, universal product code (UPC) information, and the like), the one or more merchant category codes (MCCs) associated with the transaction, a description of the transaction (which, itself, can include any transaction information, e.g., the description may describe the transaction status, the goods and/or services involved in the transaction, and the like), and/or the like.

Also regarding block 110, the apparatus having the process flow 100 can be configured to receive the transaction information in any way. For example, in some embodiments, the apparatus is configured to receive an authorization request associated with the transaction, where the authorization request includes the transaction information. In some embodiments, the apparatus is embodied as an authorization apparatus maintained by a financial institution, where the apparatus is configured to consider, approve, and/or decline authorization requests for debit transactions, credit transactions, ATM transactions, POS device transactions, and/or one or more other types of transactions that involve one or more accounts maintained by the financial institution.

In some embodiments, the apparatus having the process flow 100 is configured to receive the transaction information based at least partially on the holder swiping the credit/debit card (and/or the primary and/or account exceeding available funds or credit magnetic stripes) at the transaction machine. The phrase "swiped at the transaction machine" is meant to be understood in its broadest sense. For example, in some embodiments, where the credit/debit card is embodied as a physical card, the holder swipes the credit/debit card at the transaction machine by physically bringing the primary or account exceeding available funds or credit magnetic stripe of the credit/debit card into contact with a card reader housed in and/or operatively connected to the transaction machine. As another example, in some embodiments, where the credit/debit card is embodied as a virtual card, where the virtual card is stored on an NFC-enabled mobile device, and where the transaction machine has an NFC reader, the holder swipes the credit/debit card at the transaction machine by "tapping" the NFC-enabled mobile device to the NFC reader (e.g., holding the NFC interface of the mobile device within approximately four inches of the NFC reader, and the like).

Additionally or alternatively, the apparatus can be configured to receive the transaction information directly or indirectly from the source of the transaction. For example, in some embodiments, the apparatus is located remotely from the transaction machine but is operatively connected to the transaction machine via a network. As another example, the apparatus may include, be included in, and/or be embodied as a transaction machine. For example, in some embodiments, the apparatus having the process flow 100 includes the transaction machine referred to in block 110. As another example, in some embodiments, the apparatus having the process flow 100 is embodied as the mobile device referred to in block 130. As still another example, in some embodiments, the apparatus having the process flow 100 is embodied as a transaction machine separate from, and/or different than, the transaction machine and/or mobile device mentioned in the process flow 100.

Regarding block 120, the term "account exceeding available funds or credit," as used herein, generally refers to the difference between: (a) the total amount of one or more purchases, draws, payments, assessments, balance transfers, financial obligations, and/or other responsibilities incurred, or that will be incurred, by an account as a result of a transaction, and (b) the amount of funds and/or credit available to the account immediately prior to the transaction. In some embodiments, the account exceeding available funds or credit is referred to as a "debit account exceeding available funds or credit" if the account that incurs the account exceeding available funds or credit, or will incur the account exceeding available funds or credit, is a deposit account. For example, if a checking account has an available balance of $25 immediately before the checking account is used to pay a $50 electric bill, then the checking account will incur a $25 debit account exceeding available funds or credit payment as a result of paying the bill. In some embodiments, the term "debit account exceeding available funds or credit" refers to the amount by which the balance of an account is negative. For example, if a deposit account has an available balance of -$65, then the deposit account has one or more debits that exceed the available balance of the deposit account totaling $65. Additionally or alternatively, in some embodiments, the term "debit account exceeding available funds or credit" refers to a situation where a deposit account is found to have exceeded the available funds of the account.

In some embodiments, the account exceeding available funds or credit is referred to as "going credit account exceeding available funds or credit" and/or "incurring an credit account exceeding available funds or credit amount" if the account that incurs the account exceeding available funds or credit or will incur the account exceeding available funds or credit is a credit account. For example, if a credit account has $500 in available credit immediately prior to the credit account being used to make a $600 purchase, then it will be understood that the credit account will go over its maximum credit threshold by $100 as a result of the purchase. Additionally or alternatively, in some embodiments, the phrase "credit account exceeding available funds or credit amount" generally refers to the difference between an account balance for the credit account and a maximum credit threshold (sometimes referred to as "credit line") associated with the credit account. For example, if a credit account has a $5,000 maximum credit threshold and a $5,300 account balance, then it will be understood that the credit account has incurred one or more credit account exceeding available funds or credit amounts totaling $300.

Further regarding block 120, the apparatus configured to perform the process flow 100 can be configured to make the account exceeding available funds or credit determination sometime after the transaction has been initiated and/or before the transaction is authorized and/or completed (e.g., while the transaction is pending). In addition, the apparatus can be configured to make the account exceeding available funds or credit determination in any way. For example, in some embodiments, the apparatus is configured to make the account exceeding available funds or credit determination by determining that the account balance exceeds the available funds or the credit maximum. In some embodiments, the apparatus having the process flow 100 includes and/or is embodied as a financial transaction processing apparatus that is configured to process financial transactions involving the account and/or the transaction machine referred to in block 110. In some of these embodiments, the apparatus is configured to make account exceeding available funds or credit determinations for the account at the same time as, and/or nearly the same time as, the apparatus is processing transactions involving the account.

Additionally or alternatively, in some embodiments, the apparatus includes and/or is embodied as an authorization apparatus (e.g., the authorization apparatus 330 referred to in FIG. 3, and the like) that is configured to consider, authorize, and/or decline authorization requests and/or financial transactions. The apparatus configured to perform the process flow 100 can be configured to make account exceeding available funds or credit determinations in real time and/or in substantially real time. In some embodiments, the apparatus is configured to determine the account exceeding available funds or credit immediately or nearly immediately after the account exceeding available funds or credit transaction has been initiated at the transaction machine (e.g., upon the swipe of the credit/debit card through a POS device, upon the holder selecting an amount to withdraw from an ATM, and the like). However, the apparatus having the process flow 100 can be configured to make the account exceeding available funds or credit determination at any time from when the holder approaches the transaction machine to when the holder leaves the transaction machine. Additionally or alternatively, the apparatus can be configured to make the account exceeding available funds or credit determination at any time from when the holder initiates and/or engages in the transaction at the transaction machine to when the transaction is completed.

Regarding block 130, the account exceeding available funds or credit swipe information can be any information that indicates that the account exceeding available funds or credit magnetic stripe of the credit/debit card was swiped at the transaction machine. For example, in some embodiments, the account exceeding available funds or credit swipe information includes information from the account exceeding available funds or credit magnetic stripe (e.g., information that is actually stored on the account exceeding available funds or credit magnetic stripe of the credit/debit card, such as, for example, the account number, credit/debit card number, passcode, expiration date, CVV, and the like). In such embodiments, the information from the account exceeding available funds or credit magnetic stripe is sometimes referred to herein as "account exceeding available funds or credit magnetic stripe information." However, in other embodiments, the account exceeding available funds or credit swipe information does not include any information that is stored on the account exceeding available funds or credit magnetic stripe of the credit/debit card. For example, in some embodiments, the account exceeding available funds or credit swipe information is a notification that is generated and/or sent by the transaction machine to the apparatus having the process flow 100, where the notification reports that the account exceeding available funds or credit magnetic stripe was swiped at the transaction machine. It will be understood that, similar to account exceeding available funds or credit swipe information, the phrase "primary swipe information" refers to any information that indicates that the primary magnetic stripe of the credit/debit card was swiped at the transaction machine. The primary swipe information may include information that is actually stored on the primary magnetic stripe of the credit/debit card (i.e., "primary magnetic stripe information"), but, like the account exceeding available funds or credit swipe information, it does not have to (e.g., the primary swipe information may be embodied as a notification stating that the primary magnetic stripe was swiped at the transaction machine).

Further regarding block 130, the apparatus having the process flow 100 can receive the account exceeding available funds or credit swipe information at any time. In some embodiments, the apparatus receives the account exceeding available funds or credit swipe information before making the account exceeding available funds or credit determination. For example, in some embodiments, the transaction information includes the account exceeding available funds or credit swipe information, such that the apparatus receives the account exceeding available funds or credit swipe information by receiving the transaction information. In some embodiments, the holder may swipe the account exceeding available funds or credit magnetic stripe of the credit/debit card at the transaction machine at and/or towards the beginning of the transaction, and/or before the apparatus receives the transaction information and/or makes the account exceeding available funds or credit determination. In some of these embodiments, the holder may swipe the account exceeding available funds or credit magnetic stripe in addition to, before, and/or after swiping the primary magnetic stripe at the transaction machine. In other embodiments, the holder may swipe the account exceeding available funds or credit magnetic stripe instead of ever swiping the primary magnetic stripe at the transaction machine.

The holder may have one or more reasons for swiping the account exceeding available funds or credit magnetic stripe at the transaction machine so that the apparatus receives the account exceeding available funds or credit swipe information in the transaction information (and/or before the apparatus makes the account exceeding available funds or credit determination): (a) so that the transaction will not be declined for exceeding the available funds or the credit maximum; (b) so that the holder will avoid any potential embarrassment associated with the transaction being declined and/or the account incurring the account exceeding available funds or credit; and/or (c) so that the holder will not need to swipe the credit/debit card at the transaction machine again (e.g., the holder may swipe the account exceeding available funds or credit magnetic stripe at the beginning of the transaction instead of swiping the primary magnetic stripe, so that the holder can be assured that the transaction will go through without any further swiping (or action) being required by the holder).

Although the apparatus having the process flow 100 can be configured to receive the account exceeding available funds or credit swipe information before making the account exceeding available funds or credit determination, in other embodiments, the apparatus is configured to receive the account exceeding available funds or credit swipe information after making the account exceeding available funds or credit determination. For example, in some embodiments, the holder swipes the primary magnetic stripe at the transaction machine, the apparatus receives the primary swipe information in the transaction information, the apparatus makes the account exceeding available funds or credit determination, the apparatus declines the transaction, the holder swipes the account exceeding available funds or credit magnetic stripe at the transaction machine, and then the apparatus receives the account exceeding available funds or credit swipe information.

In some alternative embodiments (e.g., the embodiment described in connection with FIG. 2), the apparatus having the process flow 100 is configured to prompt the holder (e.g., via the transaction machine, via a mobile device accessible to the holder during the transaction, and the like) to swipe the account exceeding available funds or credit magnetic stripe at the transaction machine, where the prompting occurs after the apparatus determines that the account will incur the account exceeding available funds or credit. For example, the apparatus may generate and/or send a text message to the holder's mobile phone, where the message notifies the holder of the account exceeding available funds or credit and/or instructs the holder to swipe the account exceeding available funds or credit magnetic stripe at the transaction machine in order to complete the transaction. In some embodiments, the apparatus receives the account exceeding available funds or credit swipe information based at least partially on (e.g., after, as a result of, in response to, and the like) the apparatus prompting the holder. It will be understood that, in some embodiments, the apparatus is configured to prompt the holder within about twenty seconds of the apparatus making the account exceeding available funds or credit determination. It will also be understood that the holder may be prompted to swipe the account exceeding available funds or credit magnetic stripe as a result of the transaction being declined. In other words, in some embodiments, the apparatus is configured to decline the transaction based at least partially on making the account exceeding available funds or credit determination, and the declining the transaction implicitly prompts the holder to swipe the account exceeding available funds or credit magnetic stripe at the transaction machine. In such embodiments, the apparatus receives the account exceeding available funds or credit swipe information after making the account exceeding available funds or credit determination and/or after declining the transaction.

Regarding block 140, the apparatus is further configured to authorize the transaction based at least partially on the apparatus receiving the account exceeding available funds or credit swipe information. It will be understood that the apparatus can be configured to authorize the transaction in any way. For example, in some embodiments, the apparatus is configured to authorize the transaction by sending, to the transaction machine, one or more instructions to complete (and/or for completing) the transaction. In some embodiments, the apparatus is configured to authorize the transaction by approving an authorization request associated with the transaction. In some embodiments, the authorization request approved by the apparatus having the process flow 100 was included in the transaction information referred to in block 110. In some embodiments where the transaction machine referred to in block 110 is the apparatus having the process flow 100, the transaction machine authorizes and/or completes the transaction in response to receiving the holder's consent. In such embodiments, the transaction machine completes the transaction by performing one or more meaningful actions relevant to the transaction, such as, for example, dispensing cash, accepting a purchase transaction, accepting a check deposit, printing a receipt and/or statement, loading a prepaid storage card, transferring funds, and/or the like. In some embodiments, these one or more actions constitute the exchange central to the transaction, define the transaction, are desired by the holder to be performed, and/or were the reason the holder arrived at the transaction machine in the first place. Also, in some embodiments, the apparatus having the process flow 100 is configured to authorize the transaction by providing funds and/or credit sufficient to complete the transaction (e.g., to the account, to a merchant involved in the transaction, and the like).

Further, in some embodiments, the apparatus having the process flow 100 is configured to store account exceeding available funds or credit magnetic stripe information in a memory device (e.g., in an account profile associated with the account) before the transaction referred to in the process flow 100 is initiated. In such embodiments, the apparatus is also configured to, after receiving the account exceeding available funds or credit swipe information, determine that the account exceeding available funds or credit swipe information received matches the account exceeding available funds or credit magnetic stripe information stored in the memory device. In some of these embodiments, the apparatus is configured to authorize the transaction based at least partially on the apparatus determining that the account exceeding available funds or credit swipe information received matches the account exceeding available funds or credit magnetic stripe information stored in the memory device.

In accordance with some embodiments, the apparatus configured to perform the process flow 100 is configured to perform the portions of the process flow 100 represented by blocks 110-140 at some point after the holder approaches the transaction machine for the transaction and before the holder leaves the transaction machine. In some embodiments, this means that the apparatus is configured to perform the one or more portions of the process flow 100 (e.g., make the account exceeding available funds or credit determination, receive the account exceeding available funds or credit swipe information, authorize the transaction, and the like) during the transaction involving the transaction machine and the holder and/or while the holder is still at the transaction machine.

The apparatus configured to perform the process flow 100 can be configured to perform any of the portions of the process flow 100 represented by blocks 110-140 upon or after one or more triggering events (which, in some embodiments, is one or more of the other portions of the process flow 100). As used herein, a "triggering event" refers to an event that automatically (i.e., without human intervention) triggers the execution, performance, and/or implementation of a triggered action, either immediately, nearly immediately, or sometime after (e.g., within minutes, and the like) the occurrence of the triggering event. For example, in some embodiments, the apparatus configured to perform the process flow 100 is configured such that the apparatus receiving the transaction information (the triggering event) automatically and immediately or nearly immediately (e.g., within 3-30 seconds, and the like) triggers the apparatus to make the account exceeding available funds or credit determination (the triggered action). In some embodiments, the apparatus is additionally or alternatively configured to authorize and/or complete the transaction (triggered action) automatically and immediately or nearly immediately after receiving the account exceeding available funds or credit swipe information (triggering event).

In accordance with some embodiments, the apparatus configured to perform the process flow 100 is configured to automatically perform one or more of the portions of the process flow 100 represented by blocks 110-140, whereas in other embodiments, one or more of the portions of the process flow 100 represented by blocks 110-140 require and/or involve human intervention (e.g., a user operating the apparatus configured to perform the process flow 100, and the like). In addition, it will be understood that, in some embodiments, the apparatus configured to perform the process flow 100 (and/or a user thereof) is configured to perform one or more portions (or combinations of portions) of the process flow 100, from start to finish, within moments, seconds, and/or minutes (e.g., within approximately 1-5 minutes from start to finish, and the like). As an example, in some embodiments, the apparatus having the process flow 100 is configured to authorize and/or complete the transaction within moments, seconds, and/or minutes (e.g., within approximately 1-5 minutes, and the like) of: (a) receiving the transaction information associated with the transaction; (b) determining that the account will incur an account exceeding available funds or credit as a result of the transaction; and/or (c) receiving the account exceeding available funds or credit swipe information.

As mentioned above, in some embodiments, the apparatus having the process flow 100 is configured to provide, implement, facilitate, and/or is otherwise associated with an account exceeding available funds or credit service. As used herein, the phrase "account exceeding available funds or credit service" generally refers to a service that provides an account holder, account, and/or counterparty with the funds and/or credit necessary to cover and/or complete an account exceeding available funds or credit transaction. For example, in some embodiments, where a transaction, if completed, would exceed the available funds of a checking account by $10, the account exceeding available funds or credit service can provide the checking account with the $10 needed to complete the transaction. In accordance with some embodiments, the account exceeding available funds or credit service is referred to as an account exceeding available funds or credit service if the account participating in the service is a deposit account. In other embodiments, the account exceeding available funds or credit service is referred to as an account exceeding available funds or credit service if the account participating in the service is a credit account.

In some embodiments, as required by one or more laws, rules, and/or regulations (sometimes collectively referred to herein as "account exceeding available funds or credit regulations" for simplicity), the holder must opt into the account exceeding available funds or credit service before the holder can participate in and/or otherwise use the account exceeding available funds or credit service. It will be understood that the holder may enroll in the account exceeding available funds or credit service at a banking center, through an electronic banking account, via a call center, and/or in some other way. In addition, in some alternative embodiments, the apparatus having the process flow 100 is configured to prompt the holder to consent to, accept, and/or agree to (collectively referred to herein as "agree to" for simplicity) one or more terms of the account exceeding available funds or credit service. In some embodiments, the apparatus prompts the holder to agree to the one or more terms of the account exceeding available funds or credit service by prompting the holder to "opt into" and/or otherwise enroll in the account exceeding available funds or credit service. In some of these embodiments, the apparatus prompts the holder during the transaction.

It will be understood that the account exceeding available funds or credit service includes one or more terms, which define the one or more rights, responsibilities, privileges, payments, features, and/or obligations of the account exceeding available funds or credit service. For example, in some embodiments, the one or more terms of the account exceeding available funds or credit service describe how the account exceeding available funds or credit service works; identify the account exceeding available funds or credit service provider; define what constitutes an account exceeding available funds or credit; identify the one or more account exceeding available funds or credit payments assessed for enrolling in the account exceeding available funds or credit service, for participating in the account exceeding available funds or credit service, and/or for engaging in an account exceeding available funds or credit transaction; and/or the like. As another example, in some embodiments, the one or more terms of the account exceeding available funds or credit service requires that the holder swipe the account exceeding available funds or credit magnetic stripe at a transaction machine in order to participate in the account exceeding available funds or credit service.

In some embodiments, the account exceeding available funds or credit service is provided by a financial institution, such as a bank, and is funded by that financial institution (and not by an account held by and/or otherwise associated with the holder). For example, in some embodiments, the account exceeding available funds or credit service is provided by the same financial institution that maintains the transaction machine, the apparatus configured to perform the process flow 100, and/or the account that incurs, or will incur, the account exceeding available funds or credit. It will be understood that, in some embodiments, the account exceeding available funds or credit service (and/or the account exceeding available funds or credit service provider) is regulated in the United States by the Electronic Funds Transfer Act, also known as Federal Reserve Board Regulation E (hereinafter "Regulation E"). In other embodiments, the account exceeding available funds or credit service (and/or account exceeding available funds or credit service provider) is regulated in the United States by the Credit Card Accountability Responsibility and Disclosure Act of 2009, which is codified in the United States as Public Law No. 111-24 (sometimes referred to herein, for simplicity, as the "Credit CARD Act of 2009" or the "CARD Act"). In some embodiments, the account exceeding available funds or credit service does not contractually obligate the account exceeding available funds or credit service provider to cover amounts exceeding the available funds or credit in the account. In other words, in such embodiments, the account exceeding available funds or credit service provider may choose to cover account exceeding available funds or credit and/or account exceeding available funds or credit transactions at its discretion. However, in other embodiments, the account exceeding available funds or credit service provider is contractually obligated and/or otherwise required to cover amounts exceeding the available funds or credit incurred by an account.

In some embodiments, one or more portions of the process flow 100 may be configured to comply with one or more portions of an account exceeding available funds or credit regulation. For example, in some embodiments, receiving the account exceeding available funds or credit swipe information, as represented by block 130, may comply with one or more consent, opt-in, and/or revocation requirements of an account exceeding available funds or credit regulation. As another example, in some alternative embodiments, the apparatus is configured to send the holder a confirmation message that indicates that the holder consented to the account exceeding available funds or credit by swiping the account exceeding available funds or credit magnetic stripe at the transaction machine, and in some embodiments, this confirmation message may comply with one or more confirmation requirements of an account exceeding available funds or credit regulation.

It will be understood that the apparatus having the process flow 100 can be configured to perform one or more portions of any embodiment described and/or contemplated herein, such as, for example, one or more portions of the process flow 200 described herein and/or one or more portions of the process flows described in connection with FIGS. 4 and/or 5. Also, the number, order, and/or content of the portions of the process flow 100 are exemplary and may vary. For example, in some embodiments, the apparatus having the process flow 100 is configured to assess an payment associated with the account exceeding available funds or credit (e.g., assess an account exceeding available funds or credit payment to the account and/or to the holder, and the like), where the payment is based at least partially on the account incurring an account exceeding available funds or credit, on the account using the account exceeding available funds or credit service, on the amount of the account exceeding available funds or credit, and/or on authorizing and/or completing the transaction. In some embodiments, the apparatus is configured to: (a) assess the account an account exceeding available funds or credit payment based at least partially on the apparatus determining that the account settled negative at the end of the day in which the transaction occurred; and/or (b) determine not to assess the account an account exceeding available funds or credit payment based at least partially on the apparatus determining that the account settled non-negative (e.g., the account has a zero or positive available balance, and the like) at the end of the day in which the transaction occurred.

As another example, in some embodiments, the apparatus is configured to determine whether the account exceeding available funds or credit swipe information has been received in order to determine whether the holder has consented to the account exceeding available funds or credit. In some of these embodiments, the apparatus is configured to store (e.g., in a data store) the holder's consent to the account exceeding available funds or credit (and/or evidence that the holder swiped the account exceeding available funds or credit magnetic stripe at the transaction machine), which may, in some embodiments, be required by one or more account exceeding available funds or credit regulations. As a further example, in some embodiments, the apparatus (and/or the transaction machine referred to in block 110) is configured to authenticate the holder as a condition of receiving the account exceeding available funds or credit swipe information and/or providing account exceeding available funds or credit service. In some embodiments, the apparatus (and/or transaction machine) is configured to authenticate the holder based at least partially on account information (e.g., ATM/debit/credit card, account number, username, PIN, biometric information, barcode, and the like) the holder inserts, provides, and/or presents (collectively referred to herein as "presents" for simplicity) to the transaction machine and/or to the apparatus having the process flow 100.

As a further example of an additional or alternative portion, in some embodiments, the apparatus having the process flow 100 is configured to generate and/or send disclosure information to the holder (i.e., in addition to any disclosure information referred to in the process flow 100) before the account exceeding available funds or credit transaction is initiated, before the holder approaches the transaction machine, before the apparatus receives the transaction information, and/or before the apparatus receives the account exceeding available funds or credit swipe information. For example, in some embodiments, before the apparatus receives the transaction information, the apparatus is configured to generate and/or send disclosure information to the holder that defines one or more terms of an account exceeding available funds or credit service. This disclosure information can be sent via one or more emails, telephone calls, text messages, instant messages, IVR communications, communications specific to one or more social media networks and/or applications, direct mailings, electronic banking account-specific messages, and/or the like. In some embodiments, the disclosure information is included in one or more communications typically sent to a holder, such as, for example, a periodic (e.g., monthly) account statement. In some embodiments, where the disclosure information was sent to the holder before the transaction referred to in the process flow 100 was initiated, the holder may consent to one or more terms of the account exceeding available funds or credit service by swiping the account exceeding available funds or credit magnetic stripe at the transaction machine.

In other embodiments, instead of sending the disclosure information before the account exceeding available funds or credit transaction is initiated, the apparatus having the process flow 100 is configured to the send the disclosure information to the holder during the transaction (e.g., via the holder's mobile device and/or the transaction machine, and the like), so that the holder can review and consent to the one or more terms of the account exceeding available funds or credit service during the transaction and/or while the holder is at the transaction machine. In some of these embodiments, the holder can enroll in the account exceeding available funds or credit service at the transaction machine, after the account exceeding available funds or credit transaction has been initiated, and/or before the account exceeding available funds or credit transaction has been completed. In some embodiments, sending the disclosure information to the holder may help a financial institution comply with one or more requirements of an account exceeding available funds or credit regulation.

Referring now to FIG. 2, a more-detailed process flow 200 is illustrated for providing an account exceeding available funds or credit service involving an account exceeding available funds or credit magnetic stripe, in accordance with an embodiment of the present invention. It will be understood that the process flow 200 illustrated in FIG. 2 represents an example embodiment of the process flow 100 described in connection with FIG. 1. In accordance with some embodiments, one or more portions of the process flow 200 are performed by an apparatus having hardware and/or software configured to perform one or more portions of the process flow 200. For example, in some embodiments, one or more portions of the process flow 200 are performed, individually or collectively, by the transaction machine 320 described in connection with FIG. 3, the authorization apparatus 330, the mobile device 340, and/or by any one or more portions (e.g., applications, and the like) thereof. Also, the apparatus having the process flow 200 may include, be included in, be embodied as, and/or be operatively connected to the transaction machine referred to in the process flow 200. In accordance with some embodiments, the apparatus having the process flow 200 is maintained by a bank for the benefit of its customers. Also in accordance with some embodiments, the customer referred to in the process flow 200 is the user of the transaction machine and a customer of the bank. In addition, the account referred to in the process flow 200 is an account held by the customer and maintained by the bank.

As represented by block 205, the bank customer enrolls in an account exceeding available funds or credit service provided by the bank, such as, for example, by mail, banking center, call center, online banking, mobile banking application, and/or the like. During enrollment and/or as a result of enrolling, the customer receives a credit/debit card having a primary magnetic stripe and an account exceeding available funds or credit magnetic stripe (i.e., a dual magistrate credit/debit card), as represented by block 210. The credit/debit card may be a physical or virtual card, and the magnetic stripes may be physical or virtual stripes. After the customer receives the credit/debit card, the apparatus having the process flow 200 stores primary and/or magnetic stripe information in a datastore, as represented by block 215. In some embodiments, this information is stored in an account profile associated with the credit/debit card (and/or the account that is associated with the credit/debit card), where the account profile and many other account profiles are stored in the datastore.

Sometime after the customer enrolls in the account exceeding available funds or credit service, the customer approaches a transaction machine (e.g., POS device, ATM, kiosk, and the like) for the purpose of engaging in a transaction using the transaction machine, as represented by block 220. Thereafter, the apparatus having the process flow 200 (and/or the transaction machine) identifies and/or authenticates the customer, as represented by block 225. In some embodiments, the customer is identified and/or authenticated based at least partially on one or more credentials the customer presents at the transaction machine. In addition to being authenticated, the customer swipes the primary magnetic stripe of the credit/debit card through the card reader of the transaction machine, as represented by block 230. In some embodiments, where the credit/debit card is a physical card, the card reader is a physical card reader configured to receive information stored on the primary magnetic stripe of the credit/debit card. In other embodiments, where the credit/debit card is a virtual card stored on an NFC-enabled mobile device, the card reader is an NFC-enabled card reader configured to wirelessly and/or contactless receive information "stored" on the virtual primary magnetic stripe of the virtual card. In some embodiments, in addition to swiping the credit/debit card at the transaction machine, the customer also inputs, into a user interface of the POS device, a PIN that is associated with the credit/debit card and that is required to engage in transactions using the credit/debit card.

After swiping the primary magnetic stripe of the credit/debit card at the transaction machine, the customer selects the transaction and/or agrees to the transaction amount, as represented by block 235. Then, as represented by block 240, the transaction machine sends an authorization request to the apparatus having the process flow 200, where the authorization request includes primary swipe information. In some embodiments, the primary swipe information stored in the primary magnetic stripe of the credit/debit card.

Upon receiving the authorization request, the apparatus having the process flow 200 determines that the customer's account will incur an account exceeding available funds or credit as a result of the transaction, as represented by block 245. Thereafter, the apparatus is configured to decline the authorization request and/or otherwise decline, cancel, abort, and/or reject the transaction, as represented by block 250. In some embodiments, the apparatus declines the authorization request based at least partially on the account exceeding available funds or credit determination and/or the receiving information indicating that the primary magnetic stripe was swiped at the transaction machine.

In addition, as represented by block 255, the apparatus having the process flow 200 is configured to prompt the customer to swipe the account exceeding available funds or credit magnetic stripe of the credit/debit card at the transaction machine if the customer consents to the account exceeding available funds or credit (e.g., the customer wishes to incur the account exceeding available funds or credit and/or complete the account exceeding available funds or credit transaction). The customer may be prompted in any way. For example, in some embodiments, the apparatus having the process flow 200 is configured to prompt the customer by sending a message to the transaction machine referred to in block 220 and/or to a mobile device accessible to (e.g., carried by, controlled by, and the like) the customer during the transaction, where the message prompts the customer to swipe the account exceeding available funds or credit magnetic stripe at the transaction machine. The message may be any number and/or type of communication(s). For example, the message sent may be one or more text messages, phone calls, emails, actionable alerts, audible outputs, mobile banking application-specific messages, social media-specific messages, and/or the like. The message may be generated, rendered, displayed, and/or otherwise output visually (e.g., via a display) and/or audibly (e.g., via a speaker).

The message may include any amount and/or type of information. For example, in some embodiments, the message includes explicit instructions for the holder to swipe the account exceeding available funds or credit magnetic stripe at the transaction machine (e.g., "You have engaged in a transaction at Store A that will exceed the balance of your checking account. Please swipe your debit account exceeding available funds or credit magnetic stripe at the POS device at Store A if you agree to exceed the balance of your account in order to complete the transaction"). Additionally or alternatively, the message may implicitly prompt the customer to swipe the account exceeding available funds or credit magnetic stripe at the transaction machine by notifying the customer of the account exceeding available funds or credit, an account exceeding available funds or credit payment associated with the account exceeding available funds or credit, one or more terms of an account exceeding available funds or credit service, that the transaction was declined, and/or the like. Additionally or alternatively, in some embodiments, the apparatus is configured to send the message and/or otherwise prompt the customer within about fourteen (14) seconds of: (a) declining the authorization request; (b) determining that the account will incur an account exceeding available funds or credit; (c) receiving the authorization request; and/or (d) the transaction machine sending the authorization request.

It will be understood that, in this example embodiment, the apparatus having the process flow 200 is configured to prompt the customer during the transaction (e.g., while the holder is still at and/or near the transaction machine). As such, the customer may decline the account exceeding available funds or credit c account exceeding available funds or credit by declining to swipe the account exceeding available funds or credit magnetic stripe because, for example, the transaction involves a relatively small and/or discretionary purchase. However, in other cases, the customer may accept the account exceeding available funds or credit c account exceeding available funds or credit because the transaction involves a relatively large, emergency, and/or non-discretionary purchase. Either way, the customer is empowered with making this decision, which reduces or eliminates the possibility that the customer will unknowingly or unexpectedly engage in an account exceeding available funds or credit transaction (and/or unknowingly or unexpectedly incur an account exceeding available funds or credit payment). In addition, because the apparatus prompts the customer during the transaction, the customer is able to make this decision in real-time and/or on a per-transaction basis. Further, the apparatus may also enable the customer to make this decision discreetly (and/or prompt the customer discreetly via, for example, a mobile device), thereby avoiding any potential embarrassment associated with the account exceeding available funds or credit.

After being prompted, the customer swipes the account exceeding available funds or credit magnetic stripe of the credit/debit card through the card reader of the transaction machine to consent to the account exceeding available funds or credit, as represented by block 260. In some embodiments, where the credit/debit card is a physical card, the card reader is a physical card reader configured to receive information stored on the account exceeding available funds or credit magnetic stripe of the credit/debit card. In other embodiments, where the credit/debit card is a virtual card stored on an NFC-enabled mobile device, the card reader is an NFC-enabled card reader configured to wirelessly and/or contactless receive information "stored" on the virtual account exceeding available funds or credit magnetic stripe of the credit/debit card. In some embodiments, by swiping the account exceeding available funds or credit magnetic stripe at the transaction machine, the customer may consent, either explicitly or implicitly, to incurring the account exceeding available funds or credit, to one or more terms of an account exceeding available funds or credit service, to incurring an account exceeding available funds or credit payment associated with the account exceeding available funds or credit, to completing the account exceeding available funds or credit transaction, and/or the like.

After the customer swipes the account exceeding available funds or credit magnetic stripe at the transaction machine, the transaction machine sends a second authorization request to the apparatus having the process flow 200, as represented by bock 265. The second authorization request includes account exceeding available funds or credit swipe information indicating that the account exceeding available funds or credit magnetic stripe was swiped at the transaction machine. In addition, the second authorization request may include information from the account exceeding available funds or credit magnetic stripe and/or information associated with the transaction, credit/debit card, customer, account, and/or the like. In some embodiments, the information sent in the second authorization request is similar and/or identical to the information sent in the first authorization request referred to in connection with block 240, except that the second authorization request includes information indicating that the account exceeding available funds or credit magnetic stripe was swiped at the transaction machine, whereas the first authorization request includes information indicating that the primary magnetic stripe was swiped at the transaction machine.

After receiving the second authorization request, and if the account exceeding available funds or credit swipe information includes account exceeding available funds or credit magnetic stripe information, then the apparatus determines that the account exceeding available funds or credit swipe information sent in the second authorization request matches the account exceeding available funds or credit magnetic stripe information stored in the datastore, as represented by block 270. For example, in some embodiments, the apparatus is configured to compare a first PIN stored in the account exceeding available funds or credit magnetic stripe and sent in the second authorization request to a second PIN that is stored in the account profile associated with the account. If the two PINS match, the apparatus having the process flow 200 is configured to approve the second (and/or first) authorization request, authorize the account exceeding available funds or credit transaction, and/or instruct the transaction machine to complete the account exceeding available funds or credit transaction, as represented by block 275. Thereafter, the transaction machine completes the account exceeding available funds or credit transaction (e.g., by dispensing cash, completing a credit card payment, and the like), as represented by block 280. After the account exceeding available funds or credit transaction is completed, the customer leaves the transaction machine, as represented by block 285.

In accordance with some embodiments, one or more portions of the process flow 200 may comply with one or more requirements of an account exceeding available funds or credit regulation (e.g., Regulation E and/or the CARD Act in the United States, and the like). For example, in some embodiments, receiving information indicating that the account exceeding available funds or credit magnetic stripe was swiped at the transaction machine may comply with one or more consent requirements of an account exceeding available funds or credit regulation because, in some embodiments, the customer may consent to the account exceeding available funds or credit, the account exceeding available funds or credit payment, the account exceeding available funds or credit transaction, and/or one or more terms of an account exceeding available funds or credit service by swiping the account exceeding available funds or credit magnetic stripe at the transaction machine. In addition, in some embodiments, the apparatus completing the account exceeding available funds or credit transaction may comply with one or more account exceeding available funds or credit regulation requirements because, for example, the customer swiped the account exceeding available funds or credit magnetic stripe and was authenticated; all before the account exceeding available funds or credit transaction was completed.

Of course, it will also be understood that the embodiment illustrated in FIG. 2 is merely exemplary and that other embodiments may vary without departing from the scope and spirit of the present invention. For example, in some alternative embodiments, the apparatus having the process flow 200 approves the first authorization request at block 275 because a second authorization request is never sent and/or is not required. In other words, the apparatus can be configured to hold the original authorization request until the account exceeding available funds or credit swipe information is received and the transaction is authorized, or until a predetermined period of time has elapsed. As another example, in some alternative embodiments, the portion of the process flow 200 represented by block 255 is omitted. In other words, in such embodiments, the customer is not explicitly prompted to swipe the account exceeding available funds or credit magnetic stripe at the transaction machine after the account exceeding available funds or credit transaction is declined; instead, the customer just knows, after and/or as a result of the transaction being declined, to swipe the account exceeding available funds or credit magnetic stripe at the transaction machine in order to complete the account exceeding available funds or credit transaction. Said differently, the declining the transaction implicitly prompts the customer to swipe the account exceeding available funds or credit magnetic stripe.

In addition, in some alternative embodiments, before the apparatus compares the account exceeding available funds or credit swipe information to the account exceeding available funds or credit magnetic stripe information, the apparatus may first determine, based at least partially on the second transaction request and/or the information therein, that the account will incur an account exceeding available funds or credit as a result of the transaction. In other words, in some embodiments, the apparatus may be configured to treat and/or otherwise process the second authorization request as if it were a new authorization request. In such embodiments, the apparatus may be configured to regularly access the datastore to determine whether the account exceeding available funds or credit magnetic stripe information sent in the authorization request matches the account exceeding available funds or credit magnetic stripe information that is stored in the datastore and associated with the account.

In addition, it will also be understood that the apparatus having the process flow 200 can be configured to perform one or more portions of the process flow 200 in real time, in substantially real time, and/or at one or more predetermined times. The apparatus having the process flow 200 may be configured to perform any of the portions of the process flow 200 represented by blocks 205-285 upon or after one or more triggering events (which, in some embodiments, is the performance of one or more of the other portions of the process flow 200). In addition, in some embodiments, the apparatus having the process flow 200 (and/or a customer thereof) is configured to perform one or more portions (or combinations of portions) of the process flow 200, from start to finish, within moments, seconds, and/or minutes (e.g., within approximately 1-15 minutes, and the like).

Referring now to FIG. 3, a system 300 for providing an account exceeding available funds or credit service involving an account exceeding available funds or credit magnetic stripe is provided, in accordance with an embodiment of the present invention. As illustrated, the system 300 includes a network 310, a transaction machine 320, an authorization apparatus 330, and a mobile device 340. FIG. 3 also shows an account holder 302 and a profile 308 of an account (e.g., checking account, savings account, credit card account, LOC account, HELOC account, and the like), where the profile 308 is stored in the account datastore 338 of the authorization apparatus 330. The account is held by the holder 302, maintained by a financial institution (e.g., Bank XYZ) at which the holder 302 is a customer, and is associated with the account profile 308.

As shown in FIG. 3, in this example embodiment, the account is also associated with a physical credit/debit card 307, which has an obverse side 307A and a reverse side 307B. On the obverse side 307A, the credit/debit card 307 has various information printed, engraved, embossed, and/or otherwise disposed thereon, including the credit/debit card number (i.e., "xxxxxxxxxxxxxxxx"), the name of the holder 302 (i.e., "Individual"), the expiration date of the credit/debit card and/or account (i.e., "xx/xx"), information that identifies the bank that issued the card and maintains the account (i.e., "Bank XYZ"), and information that identifies the type of card (i.e., "credit/debit card"). On the reverse side 307B, the credit/debit card 307 has various information printed, embossed, engraved, and/or otherwise disposed thereon, including a signature line having the holder's 302 written signature (i.e., "Individual"), the last four digits of the credit/debit card number (i.e., "xxxx"), and a card verification value (CVV) (i.e., "xxx") associated with the credit/debit card 307.

In addition, the reverse side 307B also includes a physical primary magnetic stripe 303 and a physical account exceeding available funds or credit magnetic stripe 304. As shown in this example embodiment, the primary magnetic stripe 303 is positioned above and/or substantially parallel to the account exceeding available funds or credit magnetic stripe 304. Further, as shown in FIG. 3, the primary magnetic stripe 303 has a different physical appearance (e.g., size, shape, color, texture, and the like) than the account exceeding available funds or credit magnetic stripe 304, which may aid the holder 302 in distinguishing the two stripes and prevent the holder 302 from mistakenly swiping the wrong magnetic stripe. Also, both magnetic stripes are labeled (e.g., "primary magstripe," "account exceeding available funds or credit magstripe") to achieve this same purpose.

It will also be understood that the magnetic stripes are physical datastores that are configured to store information therein (e.g., the account number, name of the holder 302, expiration date, passcodes, CVVs, the identity of the issuing financial institution, the identity of the payment network, and the like). In some embodiments, the primary magnetic stripe 303 includes at least some information that is different than at least some of the information stored in the account exceeding available funds or credit magnetic stripe 304. For example, in some embodiments, the primary magnetic stripe 303 has a first passcode (e.g., PIN, password, string, and the like) stored therein, and the account exceeding available funds or credit magnetic stripe 304 has a second passcode stored therein, where the second passcode is different than the first passcode (e.g., "xxxx" vs. "XXXX").

Referring now to FIG. 3A, in this example embodiment, the account is also associated with a virtual credit/debit card 347A, which is stored in the mobile banking application 347 of the memory 346 of the mobile device 340. In some embodiments, the virtual credit/debit card 347A is embodied as one or more applications, databases, private keys, modules, plug-ins, and/or one or more other software tools. In some embodiments, the virtual credit/debit card 347A is the virtual equivalent of the physical credit/debit card 307. In addition, as shown in FIG. 3A, the virtual credit/debit card 347A also includes a virtual primary magnetic stripe 347B and a virtual account exceeding available funds or credit magnetic stripe 347C. In some embodiments, these virtual magnetic stripes are embodied as one or more applications, databases, private keys, modules, plug-ins, and/or other software tools. In some embodiments, the virtual magnetic stripes 347B, 347C are configured to store information therein, which may be similar and/or identical to the information stored in the physical magnetic stripes 303, 304 of the physical credit/debit card 307.

Referring again to FIG. 3, the account profile 308 includes account information 308A, primary magnetic stripe information 308B, and account exceeding available funds or credit magnetic stripe information 308C. In some embodiments, the holder 302 may access the account profile 308 via online banking, mobile banking, and/or text banking (e.g., by using the mobile device 340, the transaction machines 320, and/or some other apparatus). Also, as shown, the holder 302 has access to the mobile device 340, the transaction machine 320, and the credit/debit card 307. In accordance with some embodiments, the transaction machine 320 and the authorization apparatus 330 are each maintained by the same financial institution. For example, in some embodiments, the holder 302 is a customer of the financial institution (e.g., "Bank XYZ"), the authorization apparatus 330 is embodied as an ATM transaction server maintained by the financial institution, and the transaction machine 320 is embodied as an ATM maintained by the financial institution. However, in other embodiments, the transaction machine 320 and the authorization apparatus 330 are maintained by separate entities. For example, in some embodiments, the transaction machine 320 is embodied as a POS device maintained by a merchant, and the authorization apparatus 330 is embodied as an authorization server maintained by a financial institution. In accordance with some embodiments, the mobile device 340 is associated with the holder 302 and/or is carried, owned, possessed, and/or owned by the holder 302.

As shown in FIG. 3, the transaction machine 320, the authorization apparatus 330, and the mobile device 340 are each operatively and selectively connected to the network 310, which may include one or more separate networks. The network 310 may include one or more payment networks (e.g., interbank networks, any wireline and/or wireless network over which payment information is sent, and the like), telephone networks (e.g., cellular networks, CDMA networks, any wireline and/or wireless network over which communications to telephones and/or mobile phones are sent, and the like), local area networks (LANs), wide area networks (WANs), global area networks (GANs) (e.g., the Internet, and the like), and/or one or more other telecommunications networks. For example, in some embodiments, the network 310 includes a telephone network to enable communications between the authorization apparatus 330 and the mobile device 340, and a payment network to enable communications between the authorization apparatus 330 and the transaction machine 320. It will also be understood that the network 310 may be secure and/or unsecure and may also include wireless and/or wireline technology.

The transaction machine 320 may include any computerized apparatus that can be configured to perform any one or more of the functions of the transaction machine 320 described and/or contemplated herein. It will also be understood that the transaction machine 320 can include and/or be embodied as, any transaction machine described and/or contemplated herein. It will further be understood that the transaction machine 320 can initiate, perform, complete, and/or otherwise facilitate any transaction described and/or contemplated herein as being initiated, performed, and/or otherwise facilitated by a transaction machine. For example, in some embodiments, the transaction machine 320 includes and/or is embodied as an ATM, a POS device, a self-checkout machine, a vending machine, a ticketing kiosk, a personal computer, a gaming device, a mobile phone, and/or the like. As another example, in some embodiments, the transaction machine 320 is configured to initiate, perform, complete, and/or otherwise facilitate one or more financial and/or non-financial transactions, including, for example, purchasing, renting, selling, and/or leasing goods and/or services (e.g., groceries, stamps, tickets, gift certificates, DVDs, and the like); withdrawing cash; making deposits (e.g., cash, checks, and the like); making payments (e.g., paying telephone bills, sending remittances, and the like); accessing and/or navigating the Internet; and/or the like.

In some embodiments, the transaction machine 320 (and/or one or more other portions of the system 300) requires its users to authenticate themselves to the transaction machine 320 (and/or one or more other portions of the system 300) before the transaction machine 320 will initiate, perform, complete, and/or facilitate a transaction. For example, in some embodiments, the transaction machine 320 (and/or the transaction application 327) is configured to authenticate a transaction machine user based at least partially on an ATM/debit/credit card, loyalty/rewards/club card, smart card, token (e.g., USB token, and the like), username/password, PIN, biometric information, and/or one or more other credentials that the user presents to the transaction machine 320. Additionally or alternatively, in some embodiments, the transaction machine 320 is configured to authenticate a user by using one-, two-, or multi-factor authentication. For example, in some embodiments, the transaction machine 320 requires two-factor authentication, such that the holder 302 must provide a valid debit card and enter the correct PIN associated with the debit card in order to authenticate the holder 302 to the transaction machine 320.

As illustrated in FIG. 3, in accordance with some embodiments of the present invention, the transaction machine 320 includes a communication interface 322, a processor 324, a memory 326 having a transaction application 327 stored therein, and a user interface 329. In such embodiments, the processor 324 is operatively and selectively connected to the communication interface 322, the user interface 329, and the memory 326.

Each communication interface described herein, including the communication interface 322, generally includes hardware, and, in some instances, software, that enables a portion of the system 300, such as the transaction machine 320, to send, receive, and/or otherwise communicate information to and/or from the communication interface of one or more other portions of the system 300. For example, the communication interface 322 of the transaction machine 320 may include a modem, network interface controller (NIC), NFC interface, network adapter, network interface card, and/or some other electronic communication device that operatively connects the transaction machine 320 to another portion of the system 300, such as, for example, the authorization apparatus 330.

Each processor described herein, including the processor 324, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the transaction application 327 of the memory 326 of the transaction machine 320.

Each memory device described herein, including the memory 326 for storing the transaction application 327 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 3, the memory 326 includes the transaction application 327. It will be understood that the transaction application 327 can be operable (e.g., usable, executable, and the like) to initiate, perform, complete, and/or facilitate one or more portions of any embodiment described and/or contemplated herein, such as, for example, one or more portions of the process flows 100 and/or 200 described herein and/or one or more portions of the process flows described in connection with FIGS. 4 and/or 5. For example, in some embodiments, the transaction application 327 is operable to receive transaction information associated with a transaction. As another example, in some embodiments, the transaction application 327 is operable to determine, based at least partially on that transaction information, that an account (e.g., the account held by the holder 302, and the like) will incur an account exceeding available funds or credit as a result of a transaction.

In some embodiments, the transaction application 327 is operable to receive primary swipe information indicating that the primary magnetic stripe 303 of the credit/debit card 307 was swiped at the transaction machine 320. Similarly, the transaction application 327 may be operable to receive account exceeding available funds or credit swipe information indicating that the account exceeding available funds or credit magnetic stripe 304 of the credit/debit card 307 was swiped at the transaction machine 320. Where the physical credit/debit card 307 is swiped through a card reader (not shown) of the user interface 329, the transaction machine 320 may be configured to receive information from the primary magnetic stripe 303 (i.e., primary magnetic stripe information) and/or from the account exceeding available funds or credit magnetic stripe 304 (i.e., account exceeding available funds or credit magnetic stripe information). Additionally or alternatively, in some embodiments, where the virtual credit/debit card 347A (shown in FIG. 3A) is "swiped" at the transaction machine 320 by "tapping" the NFC-enabled mobile device 340 at an NFC reader (not shown) of the user interface 329, the transaction machine 320 may be configured to receive information from the virtual primary magnetic stripe 347B and/or the virtual account exceeding available funds or credit magnetic stripe 347C.

In some embodiments, the transaction application 327 is operable to decline a transaction based at least partially on receiving primary swipe information and/or making an account exceeding available funds or credit determination. Further, in some embodiments, the transaction application 327 is operable to authorize a transaction based at least partially on receiving account exceeding available funds or credit swipe information. In still other embodiments, the transaction application 327 is operable to complete one or more transactions at the transaction machine 320 (e.g., complete a purchase transaction, dispense cash, accept a check for deposit, and the like). As a further example, in some embodiments, the transaction application 327 is operable to prompt the holder 302 to swipe the account exceeding available funds or credit magnetic stripe 304 of the credit/debit card 307 (and/or the virtual account exceeding available funds or credit magnetic stripe 347C of the virtual credit/debit card 347) at the transaction machine 320. In still other embodiments, the transaction application 327 is operable to generate and/or send authorization requests associated with one or more transactions to the authorization apparatus 330.

In some embodiments, where the transaction machine 320 includes and/or is embodied as an ATM, the transaction application 327 is configured to execute on the ATM in order to initiate, perform, complete, and/or facilitate, for example, one or more cash withdrawals, deposits, and/or the like. In other embodiments, where the transaction machine 320 includes and/or is embodied as a POS device, the transaction application 327 is configured to execute on the POS device in order to initiate, perform, complete, and/or facilitate, for example, one or more debit card and/or credit card transactions. In still other embodiments, where the transaction machine 320 includes and/or is embodied as a personal computer, the transaction application 327 is configured to execute on the personal computer, and, in some embodiments, the transaction application 327 is embodied as a web browser (i.e., for navigating the Internet, and the like) that is operable to initiate, perform, complete, and/or otherwise facilitate one or more financial and/or non-financial transactions.

In some embodiments, the transaction application 327 is operable to enable the holder 302 and/or transaction machine 320 to communicate with one or more other portions of the system 300, and/or vice versa. In some embodiments, the transaction application 327 is additionally or alternatively operable to initiate, perform, complete, and/or otherwise facilitate one or more financial and/or non-financial transactions. In some embodiments, the transaction application 327 includes one or more computer-executable program code portions for causing and/or instructing the processor 324 to perform one or more of the functions of the transaction application 327 and/or transaction machine 320 described and/or contemplated herein. In some embodiments, the transaction application 327 includes and/or uses one or more network and/or system communication protocols.

As shown in FIG. 3, the transaction machine 320 also includes the user interface 329. It will be understood that the user interface 329 (and any other user interface described and/or contemplated herein) can include and/or be embodied as one or more user interfaces. It will also be understood that, in some embodiments, the user interface 329 includes one or more user output devices for presenting information and/or one or more items to the transaction machine user (e.g., the holder 302, and the like), such as, for example, one or more displays, speakers, receipt printers, dispensers (e.g., cash dispensers, ticket dispensers, merchandise dispensers, and the like), and/or the like. In some embodiments, the user interface 329 additionally or alternatively includes one or more user input devices, such as, for example, one or more buttons, keys, dials, levers, directional pads, joysticks, keyboards, keypads, mouses, accelerometers, controllers, microphones, touchpads, touchscreens, haptic interfaces, styluses, scanners, biometric readers, motion detectors, cameras, physical card readers (e.g., for reading information from physical magnetic stripes disposed on physical credit/debit cards), NFC-enabled readers (e.g., for reading information from virtual magnetic stripes associated with virtual credit/debit cards) and/or other NFC interfaces, deposit mechanisms (e.g., for depositing checks and/or cash, and the like), and/or the like for receiving information from one or more items and/or from the transaction machine user (e.g., the holder 302, and the like). In some embodiments, the user interface 329 and/or the transaction machine 320 includes one or more vaults, security sensors, locks, and/or anything else typically included in and/or near the transaction machine.

FIG. 3 also illustrates an authorization apparatus 330, in accordance with an embodiment of the present invention. The authorization apparatus 330 may include any computerized apparatus that can be configured to perform any one or more of the functions of the authorization apparatus 330 described and/or contemplated herein. It will also be understood that the authorization apparatus 330 can include and/or be embodied as any authorization apparatus described and/or contemplated herein. It will further be understood that the authorization apparatus 330 can initiate, perform, complete, and/or otherwise facilitate any transaction described and/or contemplated herein as being initiated, performed, and/or otherwise facilitated by an authorization apparatus. In some embodiments, the authorization apparatus 330 includes and/or is embodied as one or more servers, engines, mainframes, personal computers, ATMs, network devices, front end systems, back end systems, and/or the like. In some embodiments, such as the one illustrated in FIG. 3, the authorization apparatus 330 includes a communication interface 332, a processor 334, and a memory 336, which includes an authorization application 337 and an account datastore 338 stored therein. As shown, the communication interface 332 is operatively and selectively connected to the processor 334, which is operatively and selectively connected to the memory 336.

The authorization application 337 can be operable (e.g., usable, executable, and the like) to initiate, perform, complete, and/or facilitate any one or more portions of the process flows 100 and/or 200 described herein and/or one or more portions of the process flows described in connection with FIGS. 4 and/or 5. For example, in some embodiments, the authorization application 337 is operable to receive transaction information associated with a transaction. As another example, in some embodiments, the authorization application 337 is operable to determine, based at least partially on that transaction information, that an account (e.g., the account, and the like) will incur an account exceeding available funds or credit as a result of a transaction. In some embodiments, the authorization application 337 is operable to receive primary and/or account exceeding available funds or credit swipe information, and/or to decline and/or authorize a transaction based at least partially on making an account exceeding available funds or credit determination and/or receiving primary and/or account exceeding available funds or credit swipe information.

As a further example, in some embodiments, the authorization application 337 is operable to prompt the holder 302 to swipe the account exceeding available funds or credit magnetic stripe 304 of the credit/debit card 307 (and/or the virtual account exceeding available funds or credit magnetic stripe 347C of the virtual credit/debit card 347) at the transaction machine 320. In some of these embodiments, the authorization application 337 prompts the holder 302 via the user interface 329 of the transaction machine 320 and/or via the user interface 349 of the mobile device 340. In some embodiments, the authorization application 337 receiving the account exceeding available funds or credit swipe information from the holder 302 serves to indicate that the holder 302 consents to incurring an account exceeding available funds or credit amount, to incurring an account exceeding available funds or credit payment, to completing an account exceeding available funds or credit transaction, and/or to one or more terms of an account exceeding available funds or credit service. Also, in some embodiments, the authorization application 337 is operable to receive the primary swipe information and/or the account exceeding available funds or credit swipe information from the holder 302 via the transaction machine 320.

As another example, in some embodiments, the authorization application 337 is operable to generate and/or send disclosure information to the holder 302, where the disclosure information defines one or more terms of an account exceeding available funds or credit service. In some embodiments, the authorization application 337 generates and/or sends this disclosure information to the holder 302 prior to the holder 302 initiating and/or engaging in a transaction at the transaction machine 320. However, in other embodiments, the authorization application 337 is operable to send the disclosure information to the holder 302 during the account exceeding available funds or credit transaction and/or while the holder 302 is standing at the transaction machine 320. Also, in some embodiments, the authorization application 337 is further operable to prompt the holder 302 (e.g., via the user interface 329, via the user interface 349, during the account exceeding available funds or credit transaction, and the like) to agree to the one or more terms of the account exceeding available funds or credit service defined in the disclosure information. In some of these embodiments, the holder 302 may agree to the one or more terms by swiping the account exceeding available funds or credit magnetic stripe 304 and/or the virtual account exceeding available funds or credit magnetic stripe 347C at the transaction machine 320. In some embodiments, the authorization application 337 is operable to send a confirmation message to the holder 302 that confirms receipt of the holder's account exceeding available funds or credit swipe information and/or that confirms the holder's consent to the account exceeding available funds or credit and/or to completing the transaction. In some embodiments, the authorization application 337 is operable to perform one or more of these (and/or other) functions, such that a financial institution may comply with one or more account exceeding available funds or credit regulation requirements (e.g., Regulation E in the United States, and the like).

In some embodiments, the authorization application 337 is operable to enable the authorization apparatus 330 to communicate with one or more other portions of the system 300, such as, for example, the account datastore 338, the mobile device 340, and/or the transaction machine 320, and/or vice versa. In addition, in some embodiments, the authorization application 337 is operable to initiate, perform, complete, and/or otherwise facilitate one or more financial and/or non-financial transactions. In some embodiments, the authorization application 337 includes one or more computer-executable program code portions for causing and/or instructing the processor 334 to perform one or more of the functions of the authorization application 337 and/or the authorization apparatus 330 that are described and/or contemplated herein. In some embodiments, the authorization application 337 includes and/or uses one or more network and/or system communication protocols.

In addition to the authorization application 337, the memory 336 also includes the account datastore 338. As shown, the account datastore 338 stores the account profile 308, which includes account information 308A, the primary magnetic stripe information 308B, and the account exceeding available funds or credit magnetic stripe information 308C. The account information 308A may include any information associated with the account held by the holder 302, including, for example, information associated with credit/debit card 307, the virtual credit/debit card 347A, transaction histories, when the account last used an account exceeding available funds or credit service, account preferences, billing information, the terms and conditions associated with the account, and/or the like.

The primary magnetic stripe information 308B may include any information associated with the primary magnetic stripe 303 and/or the virtual primary magnetic stripe 347B. In some embodiments, this information includes an account number, holder name, expiration date of a credit/debit card, passcode (e.g., "xxxx," "XXXXXX," "chiefs," and the like), CVV, when the primary magnetic stripe was last used, and the like The account exceeding available funds or credit magnetic stripe information 308C may include any information associated with the account exceeding available funds or credit magnetic stripe 304 and/or the virtual account exceeding available funds or credit magnetic stripe 347C. In some embodiments, this information includes an account number, holder name, expiration date, passcode, CVV, when the account exceeding available funds or credit magnetic stripe was last used, and the like In some embodiments, the account number, expiration date, passcode, CVV, and the like associated with the account exceeding available funds or credit magnetic stripe information 308C may be different than the corresponding account number, expiration date, passcode, CVV, and the like associated with the primary magnetic stripe information 308B. The account exceeding available funds or credit magnetic stripe information 308C may also include any one or more conditions associated with using the account exceeding available funds or credit magnetic stripe (e.g., the account exceeding available funds or credit magnetic stripe may be used to complete ATM transactions but not POS device transactions, may be used to consent to exceeding the available funds or credit of the account by $45 or more but not less than $45, and the like).

It will be understood that the account datastore 338 can be configured to store any type and/or amount of information. In addition to the account profile 308, the account datastore 338 may include information associated with one or more account holders (e.g., the holder 302, account holders other than the holder 302), account profiles (i.e., other than the account profile 308), financial accounts (i.e., other than the account held by the holder 302), transaction machines, transaction machine users, transactions, exceeding the available funds or credit thresholds, electronic banking accounts, credit/debit cards, primary magnetic stripes, account exceeding available funds or credit magnetic stripes, mobile devices, account exceeding available funds or credit services, authorization requests, account exceeding available funds or credit regulations, and/or the like. In some embodiments, the account datastore 338 may also store any information related to providing an account exceeding available funds or credit service. In some embodiments, the account datastore 338 additionally or alternatively stores information associated with electronic banking (e.g., online banking, mobile banking, text banking, and the like) and/or electronic banking accounts.

In accordance with some embodiments, the account datastore 338 may include any one or more storage devices, including, but not limited to, datastores, databases, and/or any of the other storage devices typically associated with a computer system. It will also be understood that the account datastore 338 may store information in any known way, such as, for example, by using one or more computer codes and/or languages, alphanumeric character strings, data sets, figures, tables, charts, links, documents, and/or the like. Further, in some embodiments, the account datastore 338 includes information associated with one or more applications, such as, for example, the authorization application 337 and/or the transaction application 327. In some embodiments, the account datastore 338 provides a real-time or near real-time representation of the information stored therein, so that, for example, when the processor 334 accesses the account datastore 338, the information stored therein is current or nearly current. Although not shown, in some embodiments, the transaction machine 320 includes a transaction datastore that is configured to store any information associated with the transaction machine 320, the transaction application 327, and/or the like. It will be understood that the transaction datastore can store information in any known way, can include information associated with anything shown in FIG. 3, and/or can be configured similar to the account datastore 338.

Referring again to FIG. 3A, a block diagram is provided that illustrates the mobile device 340 of FIG. 3 in more detail, in accordance with an embodiment of the invention. In some embodiments, the mobile device 340 is a mobile phone (e.g., feature phones, smart phones, and the like), but in other embodiments, the mobile device 340 can include and/or be embodied as any other mobile device, including, but not limited to, mobile gaming devices, mobile computers (e.g., tablet computers, laptop computers, and the like), personal digital assistants (PDAs), and/or the like. In some embodiments, the mobile device is configured to send and/or receive communications (e.g., phone calls, text messages, actionable alerts, emails, social media-specific messages, and the like), present information via a user interface, play video games, and/or the like. In some embodiments, the mobile device is portable (e.g., not stationary) and/or can be carried and/or worn by and/or on a person. As shown in FIG. 3A, the mobile device 340 generally includes a processor 344 operatively connected to such devices as a memory 346, user interface 349 (i.e., user output devices 349A and user input devices 349B), a communication interface 342, a power source 345, a clock or other timer 343, a camera 341, and a positioning system device 390.

The processor 344 may include the functionality to encode and interleave messages and data prior to modulation and transmission. The processor 344 can additionally include an internal data modem. Further, the processor 344 may include functionality to operate one or more software programs, which may be stored in the memory 346. For example, the processor 344 may be capable of operating a connectivity program, such as a web browser application 348. The web browser application 348 may then allow the mobile device 340 to transmit and receive web content, such as, for example, location-based content and/or other web page content, according to a Wireless Application Protocol (WAP), Hypertext Transfer Protocol (HTTP), and/or the like.

The processor 344 is configured to use the communication interface 342 to communicate with one or more other devices on the network 310. In this regard, the communication interface 342 includes an antenna 376 operatively coupled to a transmitter 374 and a receiver 372 (together a "transceiver"). The processor 344 is configured to provide signals to and receive signals from the transmitter 374 and receiver 372, respectively. The signals may include signaling information in accordance with the air interface standard of the applicable cellular system of the wireless telephone network 310. In this regard, the mobile device 340 may be configured to operate with one or more air interface standards, communication protocols, modulation types, and access types. By way of illustration, the mobile device 340 may be configured to operate in accordance with any of a number of first, second, third, and/or fourth-generation communication protocols and/or the like. For example, the mobile device 340 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 340 may also be configured to operate in accordance with non-cellular communication mechanisms, such as via a wireless local area network (WLAN) or other communication/data networks.

The communication interface 342 may also include a near field communication (NFC) interface 370. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 370 may include a smart card, key card, proximity card, Bluetooth® device, radio frequency identification (RFID) tag and/or reader, transmitter, receiver, and/or the like. In some embodiments, the NFC interface 370 communicates information via radio, infrared (IR), and/or optical transmissions. In some embodiments, the NFC interface 370 is configured to operate as an NFC transmitter and/or as an NFC receiver (e.g., an NFC reader, and the like). In some embodiments, the NFC interface 370 enables the mobile device 340 to operate as a mobile wallet. Also, it will be understood that the NFC interface 370 may be embedded, built, carried, and/or otherwise supported in and/or on the mobile device 340. In some embodiments, the NFC interface 370 is not supported in and/or on the mobile device 340, but the NFC interface 370 is otherwise operatively connected to the mobile device 340 (e.g., where the NFC interface 370 is a peripheral device plugged into the mobile device 340, and the like). Other apparatuses having NFC interfaces mentioned herein may be configured similarly.

In some embodiments, the NFC interface 370 of the mobile device 340 is configured to contactlessly and/or wirelessly communicate information to and/or from a corresponding NFC interface of another apparatus (e.g., the transaction machine 320, and the like). For example, in some embodiments, the mobile device 340 is a mobile phone, the NFC interface 370 is a smart card having account information stored therein, and the transaction machine 320 is a POS device having an NFC reader operatively connected thereto. In such embodiments, when the mobile phone and/or smart card is brought within a relatively short range of the NFC reader, the smart card is configured to wirelessly and/or contactlessly send the account information to the NFC reader in order to, for example, initiate, perform, complete, and/or otherwise facilitate a transaction.

In addition to the NFC interface 370, the mobile device 340 can have a user interface 349 that is, like other user interfaces described herein, made up of one or more user output devices 349A and/or user input devices 349B. The user output devices 349A include a display 380 (e.g., a liquid crystal display and/or the like) and a speaker 382 and/or other audio device, which are operatively coupled to the processor 344. The user input devices 349B, which allow the mobile device 340 to receive data from a user such as the holder 302, may include any of a number of devices allowing the mobile device 340 to receive data from a user, such as a keypad, keyboard, touch-screen, touchpad, microphone, mouse, joystick, other pointer device, button, soft key, and/or other input device(s). The user interface 349 may also include a camera 341, such as a digital camera.

In some embodiments, the mobile device 340 also includes a positioning system device 390 that can be used to determine the location of the mobile device 340. For example, the positioning system device 390 may include a GPS transceiver. In some embodiments, the positioning system device 390 includes a compass. In some embodiments, the positioning system device 390 is at least partially made up of the antenna 376, transmitter 374, and receiver 372 described above. For example, in one embodiment, triangulation of cellular signals may be used to identify the approximate location of the mobile device 340. In other embodiments, the positioning system device 390 includes a proximity sensor and/or transmitter, such as an RFID tag, that can sense or be sensed by devices known to be located proximate a merchant and/or other location to determine that the mobile device 340 is located proximate these known devices.

The mobile device 340 further includes a power source 345, such as a battery, for powering various circuits and other devices that are used to operate the mobile device 340. Embodiments of the mobile device 340 may also include a clock or other timer 343 configured to determine and, in some cases, communicate actual or relative time to the processor 344 or one or more other devices.

The mobile device 340 also includes a memory 346 operatively connected to the processor 344. As used herein, memory includes any computer readable medium (as defined herein) configured to store data, code, and/or other information. The memory 346 may include volatile memory, such as volatile Random Access Memory (RAM) including a cache area for the temporary storage of data. The memory 346 may also include non-volatile memory, which can be embedded and/or may be removable. The non-volatile memory can additionally or alternatively include an electrically erasable programmable read-only memory (EEPROM), flash memory or the like.

The memory 346 can store any of a number of applications which may include computer-executable instructions/code executed by the processor 344 to implement the functions of the mobile device 340 described herein. For example, the memory 346 may include such applications as a web browser application (not shown) and/or a mobile banking application 347. As shown, in this example embodiment, the mobile banking application 347 includes the virtual credit/debit card 347A, which further includes the virtual primary magnetic stripe 347B and the virtual account exceeding available funds or credit magnetic stripe 347C. As such, the mobile device 340 is configured to operate as a mobile wallet because the mobile device 340, the mobile banking application 347, the virtual credit/debit card 347A, and/or the virtual magnetic stripes 347B, 347C may, individually or collectively, be used to engage in one or more wireless and/or contactless transactions with the transaction machine 320 and/or the authorization apparatus 330.

It will be understood that the mobile banking application 347 can be operable (e.g., usable, executable, and the like) to initiate, perform, complete, and/or facilitate any one or more portions of the process flows 100 and/or 200 described herein and/or one or more portions of the process flows described in connection with FIGS. 4 and/or 5. For example, in some embodiments, the mobile banking application 347 (and/or the web browser application 348) is operable to prompt, via the user interface 349, the holder 302 to swipe a primary and/or account exceeding available funds or credit magnetic stripe (e.g., physical, virtual) at the transaction machine 320. As still another example, in some embodiments, the mobile banking application 347 is operable to receive account exceeding available funds or credit swipe information (e.g., from the virtual account exceeding available funds or credit magnetic stripe 347C) and/or determine that the account will incur an account exceeding available funds or credit as a result of a transaction. As still a further example, in some embodiments, the mobile banking application 347 is operable to select and/or activate the virtual credit/debit card 347A and/or the virtual magnetic stripes 347B, 347C, such that the holder 302, the account, and/or virtual credit/debit card 347A may engage in a wireless and/or contactless transaction using NFC and/or mobile wallet technology.

In some embodiments, the mobile banking application provides a graphical user interface (GUI) on the display 380 that allows the holder 302 to communicate with the mobile device 340, the transaction machine 320, the authorization apparatus 330, and/or one or more other portions of the system 300. In some embodiments, the holder 302 can use the mobile banking application 347 to access the account via electronic banking (e.g., mobile banking, text banking, and the like). The memory 346 can also store any type and/or amount information used by the mobile device 340, the virtual credit/debit card 347A, the virtual magnetic stripes 347B, 347C, and/or used by the applications and/or the devices that make up the mobile device 340 and/or that are in communication with the mobile device 340, to implement the functions of the mobile device 340 and/or the other systems described and/or contemplated herein.

It will be understood that the embodiments illustrated in FIGS. 3 and 3A are exemplary and other embodiments may vary. For example, in some embodiments, some or all of the portions of the system 300 are combined into a single portion. Specifically, in some embodiments, the transaction machine 320 and the authorization apparatus 330 are combined into a single transaction and authorization apparatus that is configured to perform all of the same functions of those separate portions as described and/or contemplated herein. Likewise, in some embodiments, some or all of the portions of the system 300 are separated into two or more distinct portions. In addition, the various portions of the system 300 may be maintained by the same or separate parties.

The system 300 and/or one or more portions of the system 300 may include and/or implement any embodiment of the present invention described and/or contemplated herein. For example, in some embodiments, the system 300 (and/or one or more portions of the system 300) is configured to implement any one or more embodiments of the process flow 100 described and/or contemplated herein in connection with FIG. 1, any one or more embodiments of the process flow 200 described and/or contemplated herein in connection with FIG. 2, any one or more embodiments of the process flow described and/or contemplated herein in connection with FIG. 4, and/or any one or more of embodiments of the process flow described and/or contemplated herein in connection with FIG. 5.

As a specific example, in accordance with an embodiment of the present invention, the authorization apparatus 330 is configured to: (a) receive transaction information associated with a transaction, where the transaction involves the account, the transaction machine 320, and the holder 302, where the account is associated with a credit/debit card 307 (and/or a virtual credit/debit card 347A), and where the credit/debit card 307 (and/or virtual credit/debit card 347A) has a primary magnetic stripe 303 (and/or virtual primary magnetic stripe 347B) and an account exceeding available funds or credit magnetic stripe 304 (and/or virtual account exceeding available funds or credit magnetic stripe 347C), as represented by block 110 in FIG. 1; (b) determine, based at least partially on the transaction information, that the account will incur an account exceeding available funds or credit as a result of the transaction, as represented by block 120; (c) receive (e.g., via the user interface 329, and the like) Account exceeding available funds or credit swipe information that indicates that the account exceeding available funds or credit magnetic stripe 304 (and/or the virtual account exceeding available funds or credit magnetic stripe 347C) was swiped at the transaction machine 320, as represented by block 130; and (d) authorize the transaction based at least partially on receiving the account exceeding available funds or credit swipe information, as represented by block 140. In accordance with some embodiments, the transaction machine 320, the authorization apparatus 330, and/or the mobile device 340 are each configured to send and/or receive one or more instructions to and/or from each other, such that an instruction sent, for example, from the authorization apparatus 330 to the mobile device 340 (and/or vice versa) can trigger the mobile device 340 (and/or vice versa) to perform one or more portions of any one or more of the embodiments described and/or contemplated herein.

Referring now to FIG. 4, a mixed block and flow diagram of a system 400 for providing a debit account exceeding available funds or credit service involving a debit account exceeding available funds or credit magnetic stripe and a mobile phone is provided, in accordance with an exemplary embodiment of the present invention. It will be understood that the system 400 illustrated in FIG. 4 represents an example embodiment of the process flow 200 described in connection with FIG. 2. As shown, the system 400 includes a POS device 401 (e.g., the transaction machine 320, a merchant terminal, and the like), an authorization server 403 (e.g., the authorization apparatus 330, and the like), and a mobile phone 405 (e.g., the mobile device 340, and the like). The POS device 401, the authorization server 403, and the mobile phone 405 may each include a communication interface, a user interface, a processor, a memory, an application, and/or a datastore, and those components may be operatively connected to each other.

In accordance with some embodiments, the POS device 401 and the mobile phone 405 are operatively and selectively connected to the authorization server 403 via one or more networks (not shown). For example, in some embodiments, the POS device 401 is operatively connected to the authorization server 403 via a payment network, and/or the mobile phone 405 is operatively connected to the authorization server 403 via a telephone network. Also, the POS device 401 and the mobile phone 405 are accessible to a customer of a financial institution (not shown). Also, in this example embodiment, the POS device 401 is maintained by a merchant, the mobile phone 405 is maintained by the customer of the financial institution, and the authorization server 403 is maintained by the financial institution.

Further, in accordance with some embodiments, the financial institution maintains a checking account held by the customer and associated with the debit card mentioned below. In this example embodiment, the debit card is a physical debit card having a physical primary magnetic stripe and a physical debit account exceeding available funds or credit magnetic stripe disposed thereon. In some embodiments, at least some of the information stored in the primary magnetic stripe is different than at least some of the information stored in the debit account exceeding available funds or credit magnetic stripe (e.g., the primary magnetic stripe stores a first PIN "xxxx," and the debit account exceeding available funds or credit magnetic stripe stores a second PIN "XXXX"). In some embodiments, the debit card having the two magnetic stripes are issued to the customer before the transaction referred to in FIG. 4 is initiated (e.g., before the customer performs the function represented by block 402).

As represented by block 402, the customer swipes the primary magnetic stripe of the debit card at the POS device 401 to engage in a debit card transaction involving the customer and the merchant. Although not shown, the POS device 401 may also authenticate the customer based at least partially on one or more credentials the customer provides to the POS device 401 (e.g., based on the debit card swiped, a PIN input by the customer into the POS device 401, and the like). Next, as represented by block 404, the POS device 401 generates and sends an authorization request associated with the debit card transaction to the authorization server 403. The authorization request may include primary swipe information and/or transaction information. For example, the authorization request may include primary magnetic stripe information (e.g., the first PIN "XXXX") and/or information associated with the customer, the checking account associated with the debit card, the amount of the transaction, the one or more goods and/or services involved in the transaction, and/or the like.

After receiving the authorization request, the authorization server 403 determines that the checking account associated with the debit card will incur a debit account exceeding available funds or credit as a result of the transaction, as represented by block 406. This debit account exceeding available funds or credit determination may be based at least partially on any information included in the authorization request. Also, in this example embodiment, after making the debit account exceeding available funds or credit determination, the authorization server 403 declines the authorization request, as represented by block 408. Also, as represented by block 410, the authorization server 403 determines that the customer is enrolled in a debit account exceeding available funds or credit service provided by the financial institution. Thereafter, as represented by block 412, the authorization server 403 identifies a phone number associated with the checking account by, for example, accessing an account datastore and/or account profile having information associated with the checking account (e.g., the phone number) stored therein. In some embodiments, the customer provides the financial institution with his phone number (e.g., the phone number of the mobile phone 405) when the customer enrolls in the debit account exceeding available funds or credit service.

After the authorization server 403 identifies the phone number, the authorization server 403 sends a text message (e.g., SMS message, MMS message, EMS message, and the like) to the phone number, which corresponds to the mobile phone 405, as represented by block 414. In accordance with some embodiments, the text message received by the mobile phone 405: (a) notifies the customer of the debit account exceeding available funds or credit; and (b) prompts the customer to consent to the debit account exceeding available funds or credit by swiping the debit account exceeding available funds or credit magnetic stripe of the debit card at the POS device 401. In some embodiments, the text message received by the mobile phone 405 is delivered to the customer visually via a display of the mobile phone 405. After reading the text message at the mobile phone 405, the customer swipes the debit account exceeding available funds or credit magnetic stripe of the debit card at the POS device 401, as represented by block 416. In some embodiments, by swiping the debit account exceeding available funds or credit magnetic stripe, the customer agrees to exceed the balance of the checking account in order to complete the debit account exceeding available funds or credit transaction, agrees to complete the transaction, agrees to use the debit account exceeding available funds or credit service to complete the transaction, and/or agrees to incur one or more debit account exceeding available funds or credit payments associated with using the debit account exceeding available funds or credit service and/or exceeding the balance of the checking account.

After the customer swipes the debit account exceeding available funds or credit magnetic stripe of the debit card, the POS device 401 generates and sends another authorization request to the authorization server 403, as represented by block 418. In accordance with some embodiments, the second authorization request includes debit account exceeding available funds or credit swipe information and/or transaction information. For example, the authorization request may include debit account exceeding available funds or credit magnetic stripe information and/or information associated with the second PIN "XXXX", the customer, the checking account associated with the debit card, the amount of the transaction, the one or more goods and/or services involved in the transaction, and/or the like. After the second authorization request is sent, the authorization server 403 approves the second authorization request, as represented by block 420. In some embodiments, the authorization server 403 approves the second authorization request based at least partially on receiving information indicating that the debit account exceeding available funds or credit magnetic stripe was swiped at the POS device 401 (e.g., receiving the second PIN "XXXX," receiving a message from the POS device 401 indicating that the debit account exceeding available funds or credit magnetic stripe was swiped at the POS device 401, and the like). After the second authorization request has been approved, the transaction is completed at the POS device 401, as represented by block 422. It will be understood that, in some embodiments, the first authorization request, as represented by block 404, represents the first attempt to complete the transaction referred to in block 402, and the second authorization request, as represented by block 418, represents a second attempt to complete the same transaction. In addition to completing the transaction, in some embodiments, as represented by block 424, the authorization server 403 is configured to generate and/or send an email to the mobile phone 405 that confirms that the customer consented to the debit account exceeding available funds or credit by swiping the debit account exceeding available funds or credit magnetic stripe of the debit card at the POS device 401.

Of course, the embodiment illustrated in FIG. 4 is merely exemplary and other embodiments may vary without departing from the scope and spirit of the present invention. For example, in some alternative embodiments, the first authorization request is not declined by the authorization server 403, the text message is not sent to the customer, the customer is not required to re-swipe the debit card at the POS device 401, and the second authorization request is never sent. Instead, in such embodiments, the customer initially swipes the debit account exceeding available funds or credit magnetic stripe of the debit card at the POS device 401 instead of first swiping (or ever swiping) the primary magnetic stripe at the POS device 401. In so doing, the customer indicates his consent to exceeding the balance of his checking account from the beginning of the transaction and without necessarily knowing whether the transaction will result in the account being overdrawn. In such embodiments, the authorization server 403 is configured to approve the first authorization request referred to in block 404 based at least partially on the debit account exceeding available funds or credit swipe information included in the first authorization request.

As another example, in some alternative embodiments, one or more portions of the process flow being performed by the mobile phone 405 are performed instead by the POS device 401. As still another example, in some alternative embodiments of the present invention, instead of involving a debit card, a checking account, a debit card transaction, and/or a debit account exceeding available funds or credit service, the process flow shown in FIG. 4 involves a credit card, a credit card account, a credit card transaction, and/or a debit account exceeding available funds or credit service. As yet another example, in some alternative embodiments, the customer is not prompted via the mobile phone 405 to swipe the debit account exceeding available funds or credit magnetic stripe at the POS device 401; rather, in such embodiments, the customer is prompted to swipe the debit account exceeding available funds or credit magnetic stripe at the POS device 401 based at least partially on the transaction being declined (e.g., the transaction being declined is what prompts the customer to swipe the debit account exceeding available funds or credit magnetic stripe). As still another example, in some alternative embodiments, the customer is prompted via the POS device 401 (e.g., via a text message delivered to the POS device 401) instead of, or in addition to, being prompted via the mobile phone 405.

In some embodiments, one or more of the portions of the process flow represented by blocks 402-424 are triggered by one or more triggering events, which, in some embodiments, include the performance of one or more of the other portions of the process flow represented by blocks 402-424. Also, in some embodiments, the system 400 is configured to perform the entire process flow represented by blocks 402-424, from start to finish, within moments, seconds, and/or minutes. For example, in some embodiments, the customer swipes the debit account exceeding available funds or credit magnetic stripe at the POS device 401 (and/or consents to the debit account exceeding available funds or credit) within approximately 1-5 minutes of the authorization server 403 receiving the authorization request from the POS device 401. Further, it will be understood that one or more portions of the process flow represented by blocks 402-424 are configured to comply with one or more requirements of an account exceeding available funds or credit regulation (e.g., Regulation E and/or the CARD Act in the United States).

Referring now to FIG. 5, a mixed block and flow diagram illustrates a system 500 for providing a credit account exceeding available funds or credit service involving a virtual credit account exceeding available funds or credit magnetic stripe and a mobile phone having an NFC interface, in accordance with an exemplary embodiment of the present invention. It will be understood that the system 500 illustrated in FIG. 5 represents an example embodiment of the process flow 100 described in connection with FIG. 1. As shown, the system 500 includes a POS device 501 having an NFC interface, a mobile phone 503 having an NFC interface, and an authorization server 505. The POS device 501, the mobile phone 503, and the authorization server 505 may each include a communication interface, a user interface, a processor, a memory, an application, and/or a datastore, and those components may be operatively connected to each other.

Further, in this example embodiment, the POS device 501 and the mobile phone 503 are operatively and selectively connected to the authorization server 505 via one or more networks (not shown). For example, in some embodiments, the POS device 501 is operatively connected to the authorization server 505 via a payment network, and/or the mobile phone 503 is operatively connected to the authorization server 505 via a telephone network. In addition, the NFC interface of the mobile phone 503 and the NFC interface of the POS device 501 enable the mobile phone 503 to wirelessly and/or contactlessly communicate with the POS device 501. For example, in some embodiments, the mobile phone 503 includes an RF transmitter that is configured to wirelessly and/or contactlessly communicate information to and/or from an NFC reader associated with the POS device 501. Also, it will be understood that the POS device 501 and the mobile phone 503 are accessible to the customer referred to in block 502. For example, in some embodiments, the mobile phone 503 is carried, owned, possessed, and/or held by the customer during one or more portions of the process flow shown in FIG. 5. Also, in this example embodiment, the POS device 501 is maintained by a merchant, the mobile phone 503 is maintained by the customer, and the authorization server 505 is maintained by a bank.

Further, in this example embodiment, the bank maintains a credit card account held by the customer, which corresponds to a virtual credit card that is associated with the mobile phone 503. Specifically, the virtual credit card is embodied as software and/or hardware and may be stored in and/or on the mobile phone 503. The virtual credit card also has a virtual primary magnetic stripe and a virtual credit account exceeding available funds or credit magnetic stripe. These virtual magnetic stripes, like the virtual credit card, are also embodied as hardware and/or software stored in and/or on the mobile phone 503, and can be used to engage in transactions. For example, the operator of the mobile phone 503 (e.g., the account holder/customer) may "swipe" either (or both) of these virtual magnetic stripes at an NFC-enabled transaction machine (e.g., the NFC-enabled POS device 501) by: (a) initiating (e.g., opening, logging in to, activating, and the like) a mobile banking application; (b) selecting and/or activating the virtual credit card for use; (c) selecting and/or activating a virtual magnetic stripe of the credit card to "swipe;" and/or (d) "swiping" the virtual magnetic stripe at the transaction machine by holding the NFC interface of the mobile device within a relatively short distance (e.g., approximately four inches, and the like) of the NFC interface of the transaction machine. In some embodiments, this "swiping" involves wirelessly and/or contactlessly communicating credit card account information (e.g., virtual magnetic stripe information, account numbers, customer names, and the like) from the mobile phone 503 to the transaction machine.

As such, the mobile phone 503 is configured to operate as a mobile wallet in this example embodiment. The mobile phone 503 stores information associated with the credit card account (and/or one or more other accounts) and/or the virtual magnetic stripes, such that the credit card account information and/or virtual magnetic stripe information can be transmitted to one or more NFC-enabled transaction machines (e.g., the POS device 501) to engage in one or more transactions. In some embodiments, at least some of the information stored in the virtual primary magnetic stripe is different than at least some of the information stored in the virtual credit account exceeding available funds or credit magnetic stripe (e.g., the virtual primary magnetic stripe stores a first PIN "xxxx," and the virtual credit account exceeding available funds or credit magnetic stripe stores a second PIN "XXXX"). In some embodiments, the virtual credit card having the two virtual magnetic stripes was issued to the customer before the transaction referred to in FIG. 5 was initiated. For example, in some embodiments, the customer uploaded and/or downloaded the virtual credit card to the mobile device 503 before the customer performs the function represented by block 502. Of course, even though the virtual credit card and the virtual magnetic stripes are embodied as hardware and/or software stored in and/or on the mobile phone 503, the customer may also be issued an associated physical credit card (not shown in FIG. 5) having physical primary and credit account exceeding available funds or credit magnetic stripes disposed thereon.

As represented by block 502, the customer logs in to a mobile banking application that is installed and/or executes on the mobile phone 503, selects the virtual credit card for use, and then selects the virtual primary magnetic stripe of the credit card to swipe at the POS device 501. For example, in some embodiments, the customer selects one or more selectable digital buttons displayed on the touchscreen display of the mobile phone 503, where the selectable digital buttons represent and/or correspond to the virtual credit card and/or virtual primary magnetic stripe, and where the selectable digital buttons activate the virtual credit card and/or virtual primary magnetic stripe for use. In some embodiments, the mobile banking application authenticates the customer before providing the customer access to the mobile banking application, the virtual credit card, and/or the virtual primary magnetic stripe. In some embodiments, the customer is authenticated based at least partially on one or more credentials provided by the customer to the application (e.g., a username/password, PIN, answer to challenge question, and the like).

After logging in and making the selections, the customer "swipes" the virtual primary magnetic stripe of the virtual credit card at the POS device 501 by holding the mobile phone 503 proximate to a NFC reader of the POS device 501, as represented by block 504. For example, in some embodiments, the customer "taps" the mobile phone 503 to the POS device 501 by holding the NFC interface of the mobile phone 503 within a relatively short range of (e.g., within approximately four inches of, and the like) the NFC interface of the POS device 501. When the virtual primary magnetic stripe of the virtual credit card is "swiped" to the POS device 501, the POS device 501 receives credit card account information from the mobile phone 503, as represented by block 506. In some embodiments, the credit card account information includes information from the virtual primary magnetic stripe (e.g., the credit card account number, expiration date, a virtual primary PIN stored in the virtual primary magnetic stripe, the name of the customer, and the like). Thereafter, the POS device 501 generates and sends an authorization request associated with the transaction to the authorization server 505, as represented by block 508. In accordance with some embodiments, the authorization request includes some or all of the information transmitted from the mobile phone 503 to the POS device 501, as well as information that identifies the amount of the transaction, the one or more goods and/or services involved in the transaction, and/or the like.

After receiving the authorization request, as represented by block 510, the authorization server 505 determines that the credit card account involved in the transaction will exceed the available credit of the account as a result of the transaction. After making the credit account exceeding available funds or credit determination, the authorization server 505, in this example embodiment, determines that the customer is enrolled in a credit account exceeding available funds or credit service provided by the bank, as represented by block 512. Thereafter, as represented by block 514, the authorization server 505 identifies a mobile phone associated with the credit card account (e.g., the mobile phone 503). In some embodiments, the server 505 identifies the mobile phone by identifying a phone number (e.g., XXX-XXX-XXXX) associated with the account, which in some embodiments, is stored in an account profile associated with the account (e.g., where the account profile is stored in the server 505). In some embodiments, the customer provides the bank with his phone number (e.g., the phone number of the mobile phone 503) when the customer enrolls in the credit account exceeding available funds or credit service.

After the authorization server 505 identifies the mobile phone, the authorization server 505 sends a message (e.g., text message, automated phone call, mobile banking application-specific notification, actionable alert, email, social media-specific message, and the like) to the mobile phone 503, as represented by block 516. In accordance with some embodiments, the message notifies the customer of the credit account exceeding available funds or credit amount and/or prompts the customer to consent to exceeding the available credit of the account by "swiping" the virtual credit account exceeding available funds or credit magnetic stripe of the virtual credit card at the POS device 501. After perceiving the message at the mobile phone 503, the customer consents to exceeding the available credit of the account by selecting the virtual credit account exceeding available funds or credit magnetic stripe of the virtual credit card and then "tapping" the mobile phone 503 at the POS device 501, as represented by block 518. In some embodiments, the customer must input a username/password, PIN, and/or one or more other credentials into the mobile phone 503 before the customer is able to activate the virtual credit account exceeding available funds or credit magnetic stripe for use. In some embodiments, by "swiping" the virtual credit account exceeding available funds or credit magnetic stripe at the POS device 501, the customer agrees to the credit account exceeding available funds or credit amount, agrees to exceeding the maximum credit threshold of the credit card account, agrees to use the credit account exceeding available funds or credit service, agrees to complete the credit account exceeding available funds or credit transaction, and/or agrees to incurring an credit account exceeding available funds or credit payment for using the credit account exceeding available funds or credit service and/or for exceeding the available credit of the account.

After the customer "swipes" the virtual credit account exceeding available funds or credit magnetic stripe at the POS device 501, the authorization server 505 approves the authorization request (e.g., based at least partially on the customer "swiping" the virtual credit account exceeding available funds or credit magnetic stripe), as represented by block 520. As represented by block 522, the authorization server 505 also generates and sends an electronic receipt associated with the credit card transaction to the mobile phone 503. In some embodiments, this electronic receipt serves as a confirmation message to confirm that the customer "swiped" the virtual credit account exceeding available funds or credit magnetic stripe at the POS device 501, and/or to confirm the customer's consent to exceeding the available credit of the account and/or to completing the transaction. After the authorization request has been approved, the transaction is completed at the POS device 501, as represented by block 524.

Of course, the embodiment illustrated in FIG. 5 is merely exemplary and other embodiments may vary without departing from the scope and spirit of the present invention. For example, in some embodiments, one or more portions of the process flow being performed by the authorization server 505 are performed instead by the mobile phone 503. As another example, in some alternative embodiments of the present invention, instead of involving a credit card account and/or a credit account exceeding available funds or credit service, the system 500 shown in FIG. 5 involves a deposit account, debit account exceeding available funds or credit, and/or a debit account exceeding available funds or credit service.

Also, in some embodiments, one or more of the portions of the process flow represented by blocks 502-524 are triggered by one or more triggering events, which, in some embodiments, include the performance of one or more of the other portions of the process flow represented by blocks 502-524. Also, in some embodiments, the system 500 is configured to perform the entire process flow represented by blocks 502-524, from start to finish, within moments, seconds, and/or minutes. For example, in some embodiments, the customer "swipes" the virtual credit account exceeding available funds or credit magnetic stripe (and/or consents to exceeding the available credit of the account) within approximately 1-5 minutes of the authorization server 505 receiving the authorization request from the POS device 501. Further, it will be understood that one or more portions of the process flow represented by blocks 502-524 are configured to comply with one or more requirements of an account exceeding available funds or credit regulation (e.g., Regulation E and/or the CARD Act in the United States, and the like).

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, and the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, and the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
receiving transaction information associated with a transaction, wherein the transaction involves a transaction machine, an account and a holder of the account, and wherein the account is associated with a credit/debit card comprising primary swipe information and exceeding available funds or credit threshold swipe information and wherein the transaction information comprises the primary swipe information indicating that a primary magnetic stripe of the credit/debit card was swiped at the transaction machine;
determining, based at least partially on the transaction information, that the account will exceed available funds or credit threshold as a result of the transaction;
prompting the holder to swipe the exceeding available funds or credit threshold magnetic stripe of the credit/debit card at the transaction machine, wherein the prompting the holder occurs after the determining that the account will incur the exceeding available funds or credit threshold, wherein the prompting the holder comprises sending a message to a mobile device accessible to the holder, wherein the message prompts the holder to swipe the exceeding available funds or credit threshold magnetic stripe of the credit/debit card at the transaction machine;
receiving the exceeding available funds or credit threshold swipe information after the prompting of the holder indicating that the exceeding available funds or credit threshold magnetic stripe of the credit/debit card was swiped at the transaction machine and that the holder consents to the exceeding available funds or credit threshold, wherein at least some information stored in the exceeding available funds or credit threshold magnetic stripe is different than at least some information stored in the primary magnetic stripe; and
authorizing the transaction based at least partially on the receiving the exceeding available funds or credit threshold swipe information.

2. The method of claim 1, wherein the prompting the holder occurs within about twenty seconds of the determining that the account will incur the exceeding available funds or credit threshold.

3. The method of claim 1, wherein the prompting the holder comprises sending the amount of the exceeding available funds or credit threshold to the holder.

4. The method of claim 1, the method further comprising:
declining the transaction based at least partially on the determining that the account will incur the exceeding available funds or credit threshold, and
wherein the receiving the exceeding available funds or credit threshold swipe information comprises receiving the exceeding available funds or credit threshold swipe information after the declining the transaction.

5. The method of claim 1, wherein the receiving the exceeding available funds or credit threshold swipe information is based at least partially on the holder swiping the exceeding available funds or credit threshold magnetic stripe of the credit/debit card at a card reader operatively connected to the transaction machine.

6. The method of claim 1, wherein the exceeding available funds or credit threshold swipe information comprises information stored in the exceeding available funds or credit threshold magnetic stripe of the credit/debit card.

7. The method of claim 1, further comprising:
receiving second transaction information associated with a second transaction, wherein the second transaction involves a second transaction machine and a second account, and wherein the second account is associated with a second credit/debit card;

determining, based at least partially on the second transaction information, that the second account will exceed the available funds or credit threshold as a result of the second transaction;

receiving primary swipe information indicating that a primary magnetic stripe of the second credit/debit card was swiped at the second transaction machine; and declining the second transaction based at least partially on the receiving the primary swipe information.

8. The method of claim 1, further comprising:

storing first information in an account profile associated with the account, wherein the account profile is stored in a non-transitory computer-readable medium, and wherein the first information comprises information that is stored in the exceeding available funds or credit threshold magnetic stripe of the credit/debit card; and after receiving the exceeding available funds or credit threshold swipe information, determining that the exceeding available funds or credit threshold swipe information received matches the first information stored in the account profile, and wherein the authorizing the transaction is based at least partially on the determining that the exceeding available funds or credit threshold swipe information received matches the first information stored in the account profile.

9. The method of claim 1, wherein the credit/debit card is a virtual credit/debit card stored on the mobile device, wherein the exceeding available funds or credit threshold magnetic stripe is a virtual exceeding available funds or credit threshold magnetic stripe stored on the mobile device, and wherein the exceeding available funds or credit threshold swipe information indicates that the mobile device wirelessly transmitted, to the transaction machine, information stored in the virtual exceeding available funds or credit threshold magnetic stripe.

10. An apparatus comprising:

a communication interface configured to:

receive, via a payment network, transaction information associated with a transaction, wherein the transaction involves a transaction machine, an account and a holder of the account, and wherein the account is associated with a credit/debit card comprising primary swipe information and exceeding available funds or credit threshold swipe information, and wherein the transaction information comprises the primary swipe information indicating that a first magnetic stripe of the credit/debit card was swiped at the transaction machine; and receive the exceeding available funds or credit threshold swipe information associated with the transaction indicating that the holder consents to an exceeding available funds or credit threshold after receiving a message, wherein the exceeding available funds or credit threshold swipe information comprises swipe information indicating that a second magnetic stripe of the credit/debit card was swiped at the transaction machine, wherein the first magnetic stripe of the credit/debit card is different than the second magnetic stripe of the credit/debit card;

a processor operatively connected to the communication interface and configured to:

determine, based at least partially on the transaction information, that the account will exceed available funds or credit threshold as a result of the transaction;

instruct the communication interface to prompt the holder to swipe the second magnetic stripe of the credit/debit card at the transaction machine, wherein the processor instructs the communication interface to prompt the holder after the processor determines that the account will exceed available funds or credit threshold and wherein the processor instructs the communication interface to prompt the holder by instructing the communication interface to send the message to a mobile device accessible to the holder, wherein the message prompts the holder to swipe the second magnetic stripe of the credit/debit card at the transaction machine; and authorize the transaction based at least partially on the communication interface receiving the exceeding available funds or credit threshold swipe information.

11. The apparatus of claim 10, wherein the processor is further configured to:

decline the transaction based at least partially on the processor determining that the account will exceed available funds or credit threshold, and wherein the communication interface receives the exceeding available funds or credit threshold swipe information after the transaction is declined.

12. The apparatus of claim 10, wherein the communication interface receives the exceeding available funds or credit threshold swipe information based at least partially on the holder swiping the second magnetic stripe of the credit/debit card at a card reader operatively connected to the transaction machine.

13. The apparatus of claim 10, wherein the communication interface is further configured to:

receiving second transaction information associated with a second transaction, wherein the second transaction involves a second transaction machine and a second account, wherein the second account is associated with a second credit/debit card, and wherein the second transaction information comprises primary swipe information indicating that a primary magnetic stripe of the second credit/debit card was swiped at the second transaction machine, and wherein the processor is further configured to:

determine, based at least partially on the second transaction information, that the second account will exceed available funds or credit threshold as a result of the second transaction; and decline the second transaction based at least partially on the communication interface receiving the primary swipe information.

14. The apparatus of claim 10, wherein the second magnetic stripe of the credit/debit card comprises a passcode stored therein, the apparatus further comprising:

a memory device operatively connected to the processor and configured to store the passcode, wherein the processor is further configured to determine, after the communication interface receives the exceeding available funds or credit threshold swipe information, that the exceeding available funds or credit threshold swipe information received comprises the passcode that is stored in the memory device, and wherein the processor authorizes the transaction based at least partially on the processor determining that the exceeding available funds or credit threshold swipe information comprises the passcode that is stored in the memory device.

15. The apparatus of claim 10, wherein the credit/debit card is a virtual credit/debit card stored on the mobile device, wherein the second magnetic stripe of the credit/debit card is a virtual second magnetic stripe stored on the mobile device, and wherein the exceeding available funds or credit threshold swipe information received indicates that the mobile device wirelessly transmitted, to the transaction machine, information stored in the virtual second magnetic stripe.

16. The apparatus of claim 10, further comprising:
a non-transitory computer-readable medium comprising computer program code stored thereon, wherein said computer program code is specifically configured to cause the processor to perform one or more of the following operations when performing the computer program code:
receiving an authorization request associated with a second transaction, wherein the second transaction involves a second transaction machine and a second account, wherein the account is associated with a second credit/debit card, wherein the authorization request comprises information indicating that a first magnetic stripe of the second credit/debit card was swiped at the second transaction machine, and wherein the second credit/debit card comprises a first magnetic stripe and a second magnetic stripe, wherein the first magnetic stripe of the second credit/debit card is different than the second magnetic stripe of the second credit/debit card;
determining that an account balance exceeds the available funds or the credit maximum;
determining that the authorization request comprises information from the first magnetic stripe of the second credit/debit card;
declining the authorization request based at least partially on the determining that the authorization request comprises information from the first magnetic stripe of the second credit/debit card and the determining that the account balance exceeds the available funds or the credit maximum;
receiving a second authorization request associated with a third transaction, wherein the second transaction involves the second transaction machine and the second account;
determining that the second authorization request comprises information from the second magnetic stripe of the second credit/debit card; and
approving the second authorization request based at least partially on the determining that the second authorization request comprises information from the second magnetic stripe of the second credit/debit card.

17. The apparatus of claim 16, wherein the second transaction and the third transaction are made in the same transaction.

18. The apparatus of claim 16, wherein the receiving the second authorization request occurs within about five minutes of the declining the authorization request.

19. The apparatus of claim 16, wherein the transaction involves a second holder of the second account, the method further comprising:
prompting the second holder to swipe the second magnetic stripe of the second credit/debit card through a card reader associated with the second transaction machine, wherein the prompting the second holder occurs after the determining that the account balance exceeds the available funds or credit, and
wherein the receiving the second authorization request occurs after the prompting the second holder to swipe the second magnetic stripe of the second credit/debit card.

20. The apparatus of claim 10, wherein the communication interface is further configured to:
receive a swipe, by a second holder of a second account, of a first magnetic stripe of a second credit/debit card at a second transaction machine to engage in a second transaction, wherein the second credit/debit card is associated with the second account;
present a second message that prompts the second holder to swipe a magnetic stripe of the second credit/debit card at the second transaction machine, wherein the presenting the second message occurs after receiving the swipe of the first magnetic stripe of the second credit/debit card and while the second holder is still at the second transaction machine; and
receiving a second swipe, by the second holder, of a second magnetic stripe of the second credit/debit card at the second transaction machine, wherein receiving the second swipe of the second magnetic stripe of the second credit/debit card occurs after the presenting the second message, and wherein the second transaction is approved after the second holder swipes the second magnetic stripe of the second credit/debit card.

21. The apparatus of claim 20, wherein the second message notifies the second holder that the second transaction has been declined.

22. The apparatus of claim 20, wherein the second holder receives the second message via a second mobile device accessible to the second holder.

23. The apparatus of claim 20, wherein the second message indicates that the second account will exceed available funds or credit threshold as a result of the second transaction, and wherein the receiving the second swipe of the second-magnetic stripe of the second credit/debit card serves to indicate that the second holder consents to the exceeding available funds or credit threshold.

24. The apparatus of claim 20, wherein the communication interface is further configured to:
present to the second holder, disclosure information before receiving the swipe of the first magnetic stripe of the second credit/debit card, wherein the disclosure information defines one or more terms of an exceeding available funds or credit threshold service, and
wherein the receiving the second swipe of the second magnetic stripe of the second credit/debit card comprises agreeing, by the holder, to the one or more terms of the exceeding available funds or credit threshold service defined in the disclosure information.

25. The apparatus of claim 20, wherein first magnetic stripe of the second credit/debit card comprises a virtual first magnetic stripe stored on a second mobile device accessible to the second holder,
wherein the second magnetic stripe of the second credit/debit card comprises a virtual second magnetic stripe stored on the second mobile device,
wherein the receiving the swipe of the first magnetic stripe of the second credit/debit card at the second transaction machine comprises tapping the second mobile device at the second transaction machine so that information stored in the virtual first magnetic stripe is transmitted from the second mobile device to the second transaction machine, and
wherein the receiving the second swipe of the second magnetic stripe of the second credit/debit card at the second transaction machine comprises tapping the second mobile device at the second transaction machine so that information stored in the virtual second magnetic stripe is transmitted from the second mobile device to the second transaction machine.

26. A computer program product comprising a non-transitory computer-readable medium, wherein the non-transitory computer-readable medium comprises one or more computer-executable program code portions that, when executed by a computer, cause the computer to:
receive transaction information associated with a transaction, wherein the transaction involves a transaction machine, an account and a holder of the account, wherein the account is associated with a credit/debit card, and wherein the credit/debit card comprises a primary magnetic stripe having primary swipe information and an exceeding available funds or credit threshold magnetic stripe having exceeding available funds or credit threshold magnetic swipe information and wherein the transaction information comprises the primary swipe information indicating that the primary magnetic stripe of the credit/debit card was swiped at the transaction machine;
determine that the account will exceed available funds or credit threshold as a result of the transaction;
prompt the holder to swipe the exceeding available funds or credit threshold magnetic stripe of the credit/debit card at the transaction machine, wherein the prompting the holder occurs after the determining that the account will incur the exceeding available funds or credit threshold, wherein the prompting the holder comprises sending a message to a mobile device accessible to the holder, wherein the message prompts the holder to swipe the exceeding available funds or credit threshold magnetic stripe of the credit/debit card at the transaction machine;
receive the exceeding available funds or credit threshold swipe information after the prompting of the holder indicating that the exceeding available funds or credit threshold magnetic stripe was swiped at the transaction machine and that the holder consents to the exceeding available funds or credit threshold, wherein at least some information stored in the exceeding available funds or credit threshold magnetic stripe is different than at least some information stored in the primary magnetic stripe; and
authorize the transaction based at least partially on the computer receiving the exceeding available funds or credit threshold swipe information.

27. The computer program product of claim 26, wherein the one or more computer-executable program code portions, when executed by the computer, cause the computer to:
decline the transaction based at least partially on the computer determining that the account will incur the exceeding available funds or credit threshold, and
wherein the computer receives the exceeding available funds or credit threshold swipe information after the transaction is declined.

28. The computer program product of claim 26, wherein the one or more computer-executable program code portions, when executed by the computer, cause the computer to:
receive second transaction information associated with a second transaction, wherein the second transaction involves a second transaction machine and the account;
determine that the account will exceed available funds or credit threshold as a result of the second transaction; and
receive the primary swipe information indicating that the primary magnetic stripe of the credit/debit card was swiped at the second transaction machine; and
decline the second transaction based at least partially on the computer receiving the primary swipe information.

29. A system comprising:
a credit/debit card associated with an account and a holder of the account and configured to be swiped at a transaction machine comprising a primary magnetic stripe having primary swipe information and an exceeding available funds or credit threshold magnetic stripe having exceeding available funds or credit threshold magnetic swipe information; and
an authorization apparatus operatively connected to the transaction machine via a payment network, and configured to:
receive transaction information associated with a transaction, wherein the transaction involves the transaction machine, the account and the holder of the account, wherein the transaction information comprises the primary swipe information indicating that the primary magnetic stripe of the credit/debit card was swiped at the transaction machine;
determine that the account will exceed available funds or credit threshold as a result of the transaction;
prompt the holder to swipe the exceeding available funds or credit threshold magnetic stripe of the credit/debit card at the transaction machine, wherein the prompting the holder occurs after the determining that the account will incur the exceeding available funds or credit threshold, wherein the prompting the holder comprises sending a message to a mobile device accessible to the holder, wherein the message prompts the holder to swipe the exceeding available funds or credit threshold magnetic stripe of the credit/debit card at the transaction machine;
receive the exceeding available funds or credit threshold swipe information after the prompting of the holder indicating that the exceeding available funds or credit threshold magnetic stripe was swiped at the transaction machine and that the holder consents to the exceeding available funds or credit threshold, wherein at least some information stored in the exceeding available funds or credit threshold magnetic stripe is different than at least some information stored in the primary magnetic stripe; and
authorize the transaction based at least partially on the computer receiving the exceeding available funds or credit threshold swipe information.

30. The system of claim 29, wherein the exceeding available funds or credit threshold magnetic stripe is disposed on the same side of the credit/debit card as the primary magnetic stripe.

31. The system of claim 29, wherein the primary magnetic stripe has a different physical appearance than the exceeding available funds or credit threshold magnetic stripe.

32. The system of claim 29, wherein the primary magnetic stripe comprises a first passcode stored therein, wherein the exceeding available funds or credit threshold magnetic stripe comprises a second passcode therein, and wherein the second passcode is different than the first passcode.

33. The system of claim 29, wherein the credit/debit card, the primary magnetic stripe, and the exceeding available funds or credit threshold magnetic stripe are all embodied as software and stored on the mobile device.

34. The system of claim 29, wherein the authorization apparatus is further configured to:
decline a first exceeding available funds or credit threshold transaction involving the account if the primary magnetic stripe of the credit/debit card was swiped at the transaction machine to engage in the first exceeding available funds or credit threshold transaction; and approve a second exceeding available funds or credit threshold transaction involving the account if the exceeding available funds or credit threshold magnetic stripe of the credit/debit card was swiped at the transaction machine to engage in the second exceeding available funds or credit threshold transaction.

\* \* \* \* \*